(12) United States Patent
Roy et al.

(10) Patent No.: US 10,346,306 B2
(45) Date of Patent: Jul. 9, 2019

(54) PROCESSOR AND METHOD FOR MEMORY PERFORMANCE MONITORING UTILIZING A MONITOR FLAG AND FIRST AND SECOND ALLOCATORS FOR ALLOCATING VIRTUAL MEMORY REGIONS

(71) Applicant: Intel Corporation, Santa Clara, CA (US)

(72) Inventors: Amitabha Roy, Santa Clara, CA (US);
Subramanya R. Dulloor, Santa Clara, CA (US); Rajesh M. Sankaran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 15/089,534

(22) Filed: Apr. 2, 2016

(65) Prior Publication Data

US 2017/0286302 A1 Oct. 5, 2017

(51) Int. Cl.
*G06F 12/08* (2016.01)
*G06F 12/10* (2016.01)
(Continued)

(52) U.S. Cl.
CPC ...... *G06F 12/0831* (2013.01); *G06F 12/1027* (2013.01); *G06F 2212/621* (2013.01); *G06F 2212/68* (2013.01)

(58) Field of Classification Search
CPC ............. G06F 12/0831; G06F 12/1027; G06F 2212/621; G06F 2212/68
See application file for complete search history.

(56) References Cited

U.S. PATENT DOCUMENTS 5,613,063 A 3/1997 Eustace et al.
5,657,475 A * 8/1997 Gillespie ............. G06F 12/1441
711/152

(Continued)

FOREIGN PATENT DOCUMENTS

WO 2005065205 A2 7/2005

OTHER PUBLICATIONS

Written Opinion of the International Searching Authority for Application No. PCT/US2017/022378, dated Aug. 8, 2017, 7 pages.*

(Continued)

*Primary Examiner* — Glenn Gossage
(74) *Attorney, Agent, or Firm* — Nicholson De Vos Webster & Elliott LLP

(57) ABSTRACT

Methods and apparatuses relating to memory performance monitoring are described, including a processor and method for memory performance monitoring utilizing a monitor flag and first and second allocators for allocating virtual memory regions. In one embodiment, a processor includes at least one core, a performance monitoring unit, and a memory management unit including a first allocator to allocate a first virtual memory region of a memory for a first data structure, and a second allocator to allocate a second, different virtual memory region of the memory for a second data structure, wherein the memory management unit is to enable the performance monitoring unit to monitor a memory access request from the at least one core when a monitor flag is set for the first virtual memory region or the second, different virtual memory region, and a translation lookaside buffer (TLB) comprising a protection key for a page of a page table, wherein the is to translate a virtual address of the memory access request to a physical address and to set the monitor flag when the page includes the virtual address of the memory access request and the protection key indexes (Continued)

into a key register that indicates the virtual address of the memory access request is to be monitored, wherein the memory management unit is to append the monitor flag to the physical address.

24 Claims, 18 Drawing Sheets

(51) Int. Cl.
*G06F 12/0831* (2016.01)
*G06F 12/1027* (2016.01)

(56) References Cited

U.S. PATENT DOCUMENTS

| | | | |
|---|---|---|---|
| 5,774,724 A * | 6/1998 | Heisch | G06F 11/3409 |
| | | | 714/E11.192 |
| 5,937,437 A * | 8/1999 | Roth | G06F 11/3409 |
| | | | 711/202 |
| 6,748,558 B1 * | 6/2004 | Gonzales | G06F 11/3409 |
| | | | 702/182 |
| 7,058,786 B1 | 6/2006 | Oliveri | |
| 8,019,947 B2 * | 9/2011 | Jacobson | G06F 9/3004 |
| | | | 711/141 |
| 2005/0155022 A1 | 7/2005 | Dewitt, Jr. et al. | |
| 2006/0143421 A1 * | 6/2006 | Subramoney | G06F 11/348 |
| | | | 711/170 |
| 2007/0043531 A1 * | 2/2007 | Kosche | G06F 11/3447 |
| | | | 702/182 |
| 2008/0222382 A1 * | 9/2008 | Snyder | G06F 11/3466 |
| | | | 711/200 |
| 2008/0256524 A1 | 10/2008 | Saraswati | |
| 2008/0263301 A1 * | 10/2008 | Mathews | G06F 12/1466 |
| | | | 711/164 |
| 2009/0300638 A1 * | 12/2009 | Gustafsson | G06F 9/5016 |
| | | | 718/104 |
| 2011/0302388 A1 * | 12/2011 | Reynya | G06F 12/023 |
| | | | 711/171 |
| 2013/0232315 A1 * | 9/2013 | Tian | G06F 12/0284 |
| | | | 711/170 |
| 2016/0110298 A1 | 4/2016 | Koufaty et al. | |

OTHER PUBLICATIONS

International Search Report for Application No. PCT/US2017/022378, dated Aug. 8, 2017, 3 pages.*
Intel Corporation, "Intel 64 and IA-32 Architectures Software Developer's Manual, vol. 3 (3A, 3B, 3C and 3D)-System programming guide", Sep. 2016, 1998 Pages.
International Preliminary Report on Patentability for Application No. PCT/US2017/022378, dated Oct. 11, 2018, 9 pages.

* cited by examiner

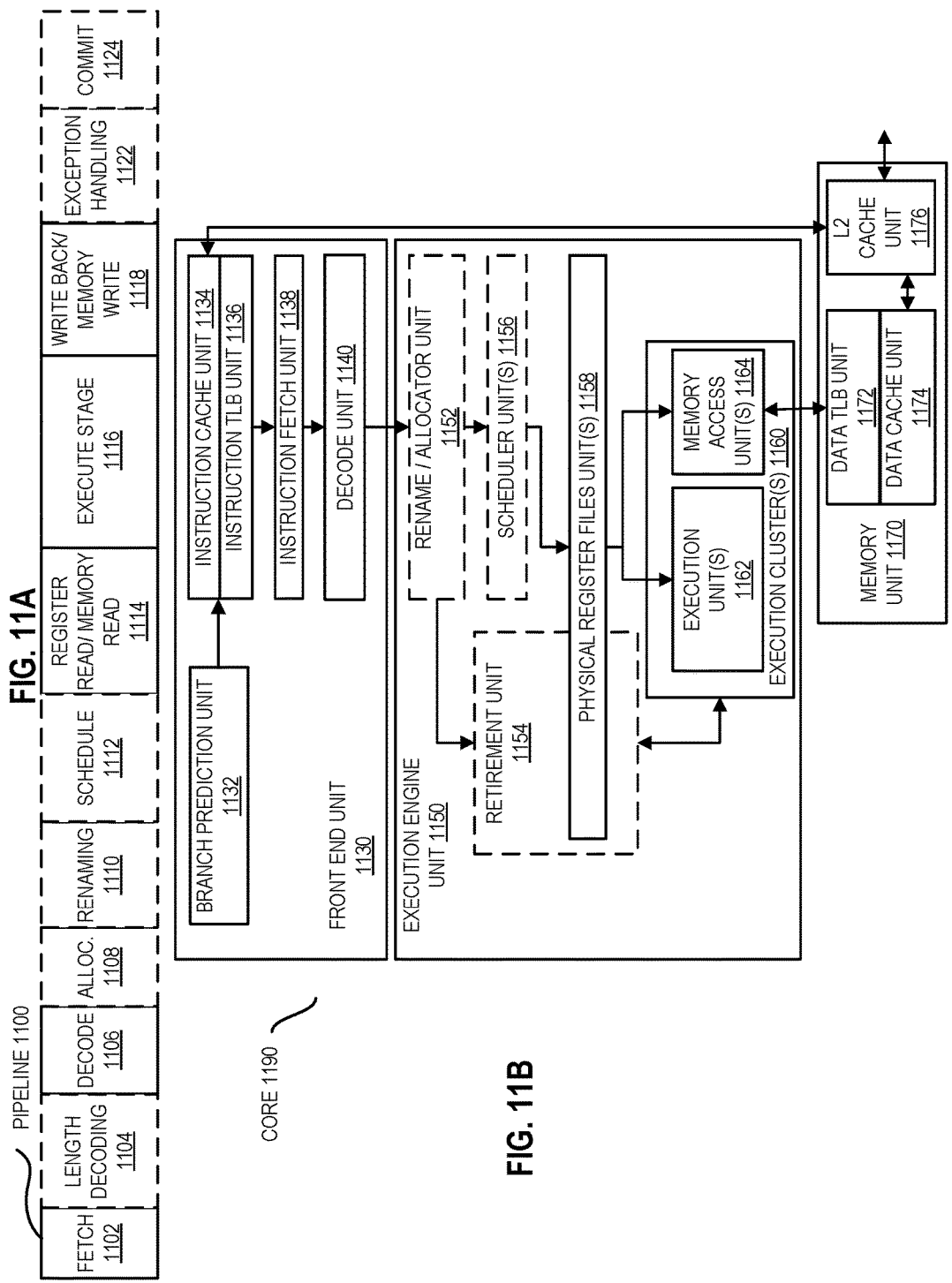

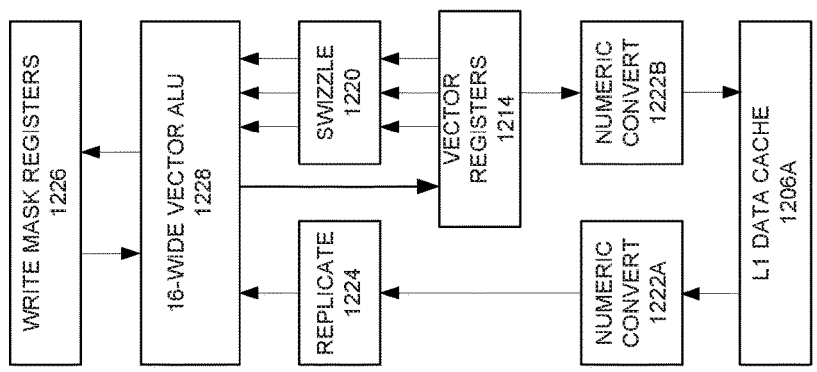
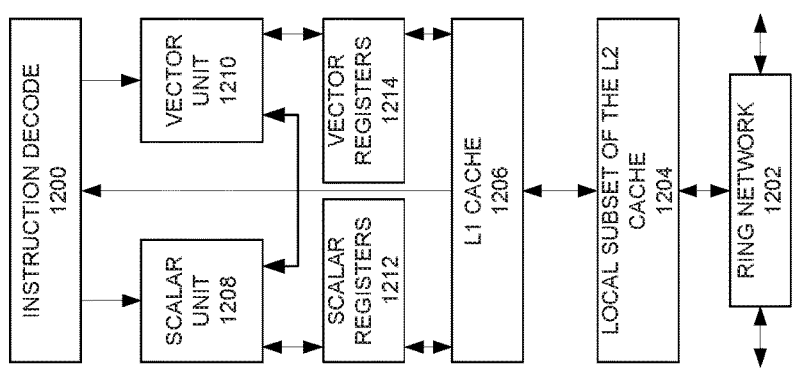

PROCESSOR AND METHOD FOR MEMORY PERFORMANCE MONITORING UTILIZING A MONITOR FLAG AND FIRST AND SECOND ALLOCATORS FOR ALLOCATING VIRTUAL MEMORY REGIONS

TECHNICAL FIELD

The disclosure relates generally to electronics, and, more specifically, an embodiment of the disclosure relates to a hardware processor with memory performance monitoring hardware.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macroinstructions.

BRIEF DESCRIPTION OF THE DRAWINGS

The present disclosure is illustrated by way of example and not limitation in the figures of the accompanying drawings, in which like references indicate similar elements and in which:

FIG. 11A is a block diagram illustrating both an exemplary in-order pipeline and an exemplary register renaming, out-of-order issue/execution pipeline according to embodiments of the disclosure.

FIG. 11B is a block diagram illustrating both an exemplary embodiment of an in-order architecture core and an exemplary register renaming, out-of-order issue/execution architecture core to be included in a processor according to embodiments of the disclosure.

FIG. 12A is a block diagram of a single processor core, along with its connection to the on-die interconnect network and with its local subset of the Level 2 (L2) cache, according to embodiments of the disclosure.

FIG. 12B is an expanded view of part of the processor core in FIG. 12A according to embodiments of the disclosure.

DETAILED DESCRIPTION

Figure 1:
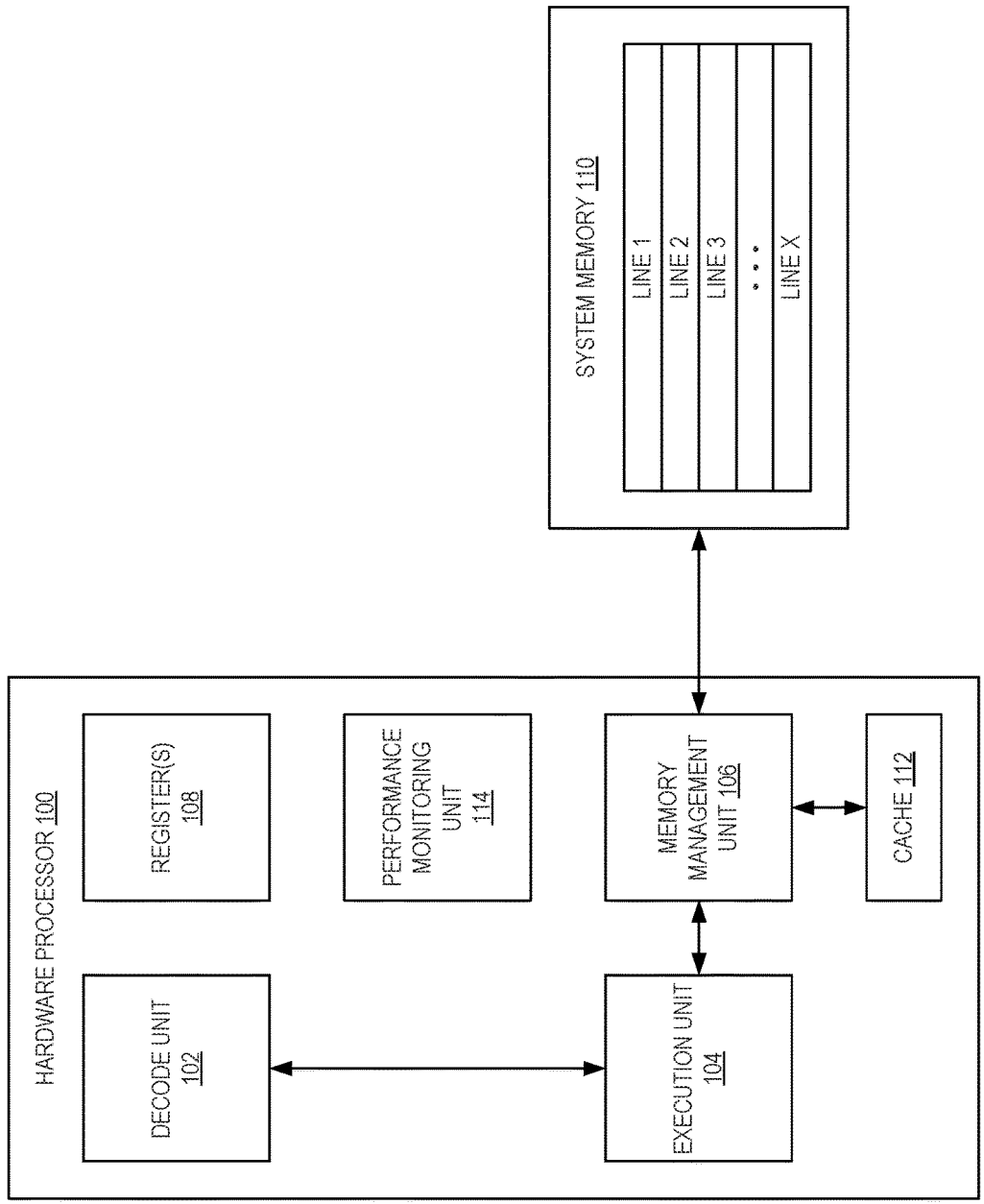
FIG. 1 illustrates a hardware processor according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions to operate on data, for example, to perform arithmetic, logic, or other functions. A hardware processor may access data in a memory. In one embodiment, a hardware processor is a client requesting access to (e.g., load or store) data and the memory is a server containing the data. In one embodiment, a computer includes a hardware processor requesting access to (e.g., load or store) data and the memory is local to the computer. Memory may be divided into separate blocks, e.g., (e.g., one or more cache lines), of data that may be managed as a unit for coherence purposes. In certain embodiments, a (e.g., data) pointer (e.g., an address) is a value that refers to (e.g., points to) the location of data, for example, a pointer may be an (e.g., linear) address and that data may be stored at that (e.g., linear) address. In certain embodiments, memory may be divided into multiple lines and each line may be have its own (unique) address. For example, a line of memory may include storage for 512 bits, 256 bits, 128 bits, 64 bits, 32 bits, 16 bits, or 8 bits of data. An address may be a virtual address or a physical address. A processor may convert a virtual address (e.g., as seen by a program running on the processor) to a physical address (e.g., the address in memory hardware).

A translation lookaside buffer (e.g., TLB) may convert a virtual address to a physical address (e.g., of the system memory). A TLB may include a data table to store (e.g., recently used) virtual-to-physical memory address translations, e.g., such that the translation does not have to be performed on each virtual address present to obtain the physical memory address. If the virtual address entry is not in the TLB, a processor may perform a page walk to determine the virtual-to-physical memory address translation.

A processor (e.g., microprocessor) may include performance monitoring infrastructure (e.g., a hardware performance monitoring unit) for measuring (e.g., tracking) performance monitoring events. One embodiment of performance monitoring events are those related to memory accesses, for example, the number of cache accesses and cache misses, e.g., of each level of a multiple level cache. Data output from a performance monitoring unit may assist (e.g., a programmer) in optimizing code to take the best advantage of underlying hardware.

However, performance monitoring events may be measured (e.g., counted) for all memory accesses and therefore there is no way to specialize the counts to individual data structures, e.g., of a program. This may make profiling large and complex programs difficult. Emerging memory technologies (such as three-dimensional (3D)—dynamic random access memory (DRAM) and non-volatile memory (NVM)) present (e.g., to a programmer) different types of directly addressable system (e.g., main) memory. The system and/or programmer may then be faced with the task of choosing where to place (e.g., the key) data structures of their program in such heterogeneous memory environments. For example, in order to make an effective placement decision for these data structures, it may be important to understand the flow of memory operations belonging to different pieces of data as they move from the core (e.g., through the last level cache(s)) to the different types of memory. Certain embodiments of monitoring the events related to memory accesses may be inadequate in filtering out noise. As an example, consider a typical database that has a relatively small index in comparison to its large amount of data. In the case of system (e.g., main) memory databases, the programmer might expect the entire index to fit in cache (cache memory) while the data does not. In this example, merely monitoring the miss rate from the last level cache is inadequate to verify this. For example, there will be a high miss rate due to the data (e.g., excluding the index) that will not fit in cache and therefore one cannot determine that the index does fit into the cache merely by looking at the miss rate.

Certain embodiments of this disclosure provide for use of (e.g., a program or programmer to use) a specialized memory allocator to place the objects constituting the index of the database in one or more contiguous ranges of virtual memory addresses. Certain embodiments of this disclosure provide for use of (e.g., a program or programmer to use) hardware extensions to monitor those virtual address ranges. Certain embodiments of this disclosure provide for counting (e.g., a program or programmer to count) last level cache (LLC) misses and total accesses only for memory operations on the index of the database. Certain embodiments herein allow for (e.g., easier) profiling of large and complex programs. Certain embodiments herein provide specialized counts (e.g., from counters) to individual data structures, e.g., of a program. Certain embodiments herein provide for region based counters (RBC), e.g., for each of a plurality of virtual memory regions.

In one embodiment, a software stack and/or hardware is enhanced with a special memory allocator that enables placement (e.g., programmers to place) the data structures of interest in different virtual memory regions, e.g., regions that are larger than a page of memory. In one embodiment, multiple data structures will not occupy the same virtual memory region, for example, such that all accesses to a single data structure are limited to a (relatively small) number of virtual memory regions. Hardware (e.g., a processor) may allow (e.g., a program or programmer to enable) monitoring of specified virtual memory regions. In one embodiment, all memory operations that are generated carry a monitor flag (e.g., a single bit or multiple bits) to indicate whether they access an address in a (e.g., any) region of interest. Performance monitoring events thus may be generated only for those memory operations that carry a set (e.g., logical high) monitor flag (e.g., bit), for example, to restrict the counting of performance monitoring events to only those memory operations that access specific data structures of interest.

Turning now to the Figures, FIG. 1 illustrates a hardware processor 100 according to embodiments of the disclosure. Depicted hardware processor 100 includes a hardware decode unit 102 (e.g., decode circuit) to decode an instruction, e.g., an instruction that is to request access to memory, for example, cache 112 (e.g., cache memory) or system (e.g., main) memory 110. An instruction may include a virtual address for the portion (e.g., line) of memory. Depicted hardware execution unit 104 (e.g., execution circuit) is to execute the decoded instruction, e.g., the instruction that is to request access to memory. Hardware processor 100 may include one or more registers 108, for example, a bound(s) and/or key register as discussed herein. Hardware processor 100 includes a coupling (e.g., connection) to system memory 110. Memory 110 may be a main memory local to the hardware processor (e.g., system memory). Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein.

Hardware processor 100 includes a memory management unit 106, for example, to control access (for example, for a memory access request, e.g., from the execution unit 104) to the (e.g., addressable) memory. In one embodiment, hardware processor includes a connection to the memory. In one embodiment, a hardware processor includes multiple cores (e.g., with respective execution unit(s)) and a single memory management unit for the processor. A memory management unit may be on chip with a processor or processor core.

Hardware processor 100 includes a performance monitoring unit 114. In one embodiment, performance monitoring unit 114 (e.g., which may be a part of memory management unit 106 or other circuitry of the processor) is to track performance monitoring events, e.g., with one or more counters thereof. Table 1 below provides examples of performance monitoring events.

TABLE 1

EXAMPLE PERFORMANCE MONITORING EVENTS

Description 1. (Read/Write). Counts the number of demand and cache prefetch data reads of full and partial cache lines as well as demand data page table entry cache line reads. Does not count L2 data read prefetches or instruction fetches.
2. (R/W). Counts the number of demand and cache prefetch reads for ownership (RFO) requests generated by a write to data cache line. Does not count L2 RFO.
3. (R/W). Counts the number of demand and cache prefetch instruction cache line reads.
Does not count L2 code read prefetches.
4. (R/W). Counts the number of writeback (modified to exclusive) transactions.
5. (R/W). Counts the number of data cache line reads generated by L2 prefetchers.
6. (R/W). Counts the number of RFO requests generated by L2 prefetchers.
7. (R/W). Counts the number of code reads generated by L2 prefetchers.
8. (R/W). Counts one of the following transaction types, including L3 (e.g., LLC) invalidate, I/O, full or partial writes, write combining (WC) or non-temporal stores, cache line flush (CLFLUSH), Fences, lock, unlock, split lock.
9. (R/W). L3 Hit: local or remote home requests that hit L3 cache (e.g., LLC) in the uncore with no coherency actions required (snooping).
10. (R/W). L3 Hit: local or remote home requests that hit L3 cache in the uncore and was serviced by another core with a cross core snoop where no modified copies were found (clean).
11. (R/W). L3 Hit: local or remote home requests that hit L3 cache in the uncore and was serviced by another core with a cross core snoop where modified copies were found (HITM).
12. Reserved
13. (R/W). L3 Miss: local homed requests that missed the L3 cache and was serviced by forwarded data following a cross package snoop where no modified copies found.
(Remote home requests are not counted)
14. (R/W). L3 Miss: remote home requests that missed the L3 cache and were serviced by remote memory (e.g., DRAM).
15. (R/W). L3 Miss: local home requests that missed the L3 cache and were serviced by local memory (e.g., DRAM).
16. (R/W). Non-DRAM requests that were serviced by the Input/Output Hub (IOH).

For example, each count may be tracked (and stored) by a respective counter (e.g., a counter circuit). In one embodiment, one or more counters are in performance monitoring unit 114 or other circuitry of the processor. Certain embodiments of this disclosure provide specialized counts to individual data structures or a group of data structures, e.g., in contrast to a count for all memory transactions (e.g., to a level of a cache)

Figure 2:
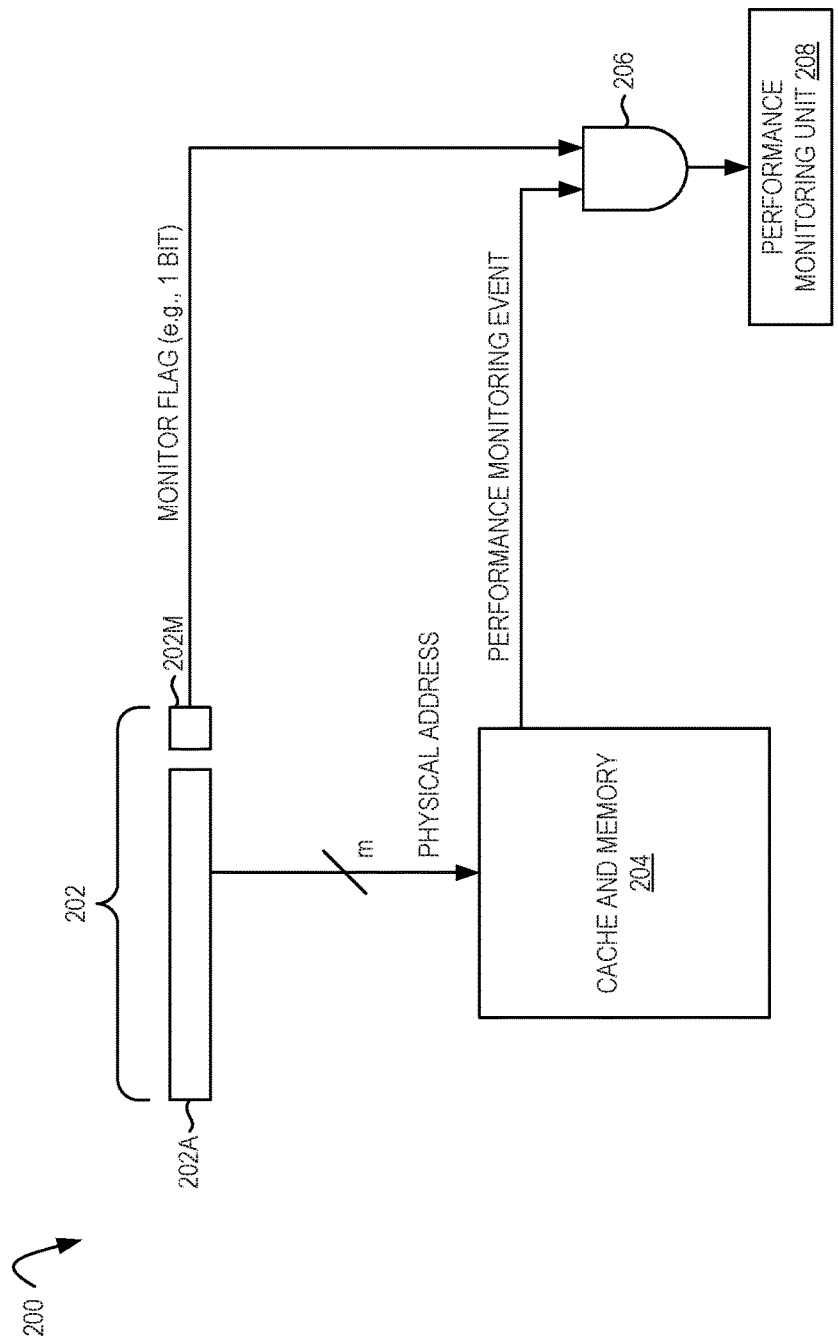
FIG. 2 illustrates a hardware circuit, including a cache and memory, and a performance monitoring unit, according to embodiments of the disclosure.

FIG. 2 illustrates a hardware circuit 200 according to embodiments of the disclosure. Circuit 200 is to receive (e.g., as an input from a memory management unit or other memory controller or circuit) an address 202A (e.g., physical address) with a monitor flag 202M together as value 202. In one embodiment, a monitor flag is a single bit (e.g., appended onto an end of the address). For example, one of a high or low bit may indicate the monitor flag is set (e.g., to enable the monitoring) and the other of the high or low bit may indicate the monitor flag is not set (e.g., to disable the monitoring). In one embodiment, the monitor flag field is included with (e.g., appended to) all physical memory addresses. In FIG. 2, the physical address may be selected (e.g., via a mux, not shown) to go to a (e.g., appropriate) memory unit (e.g., cache and memory 204). Cache and memory are shown in one box, but may be separate components. Cache and/or memory (e.g., cache 112 and/or system memory 110 in FIG. 1) may send data corresponding to a performance monitoring event, for example, such that a counter of performance monitoring unit 208 may keep track of the event. Performance monitoring unit 208 may monitor for the occurrence of one or more events. In FIG. 2, the performance monitoring unit 208 is to track the event corresponding to the memory access request (e.g., targeted by the physical address) when the monitor flag 202M is set. An AND gate 206 in this embodiment is to only output a signal for the performance monitor event (e.g., a logical one) when the monitor flag is also set (e.g., to a logical one).

Figure 3:
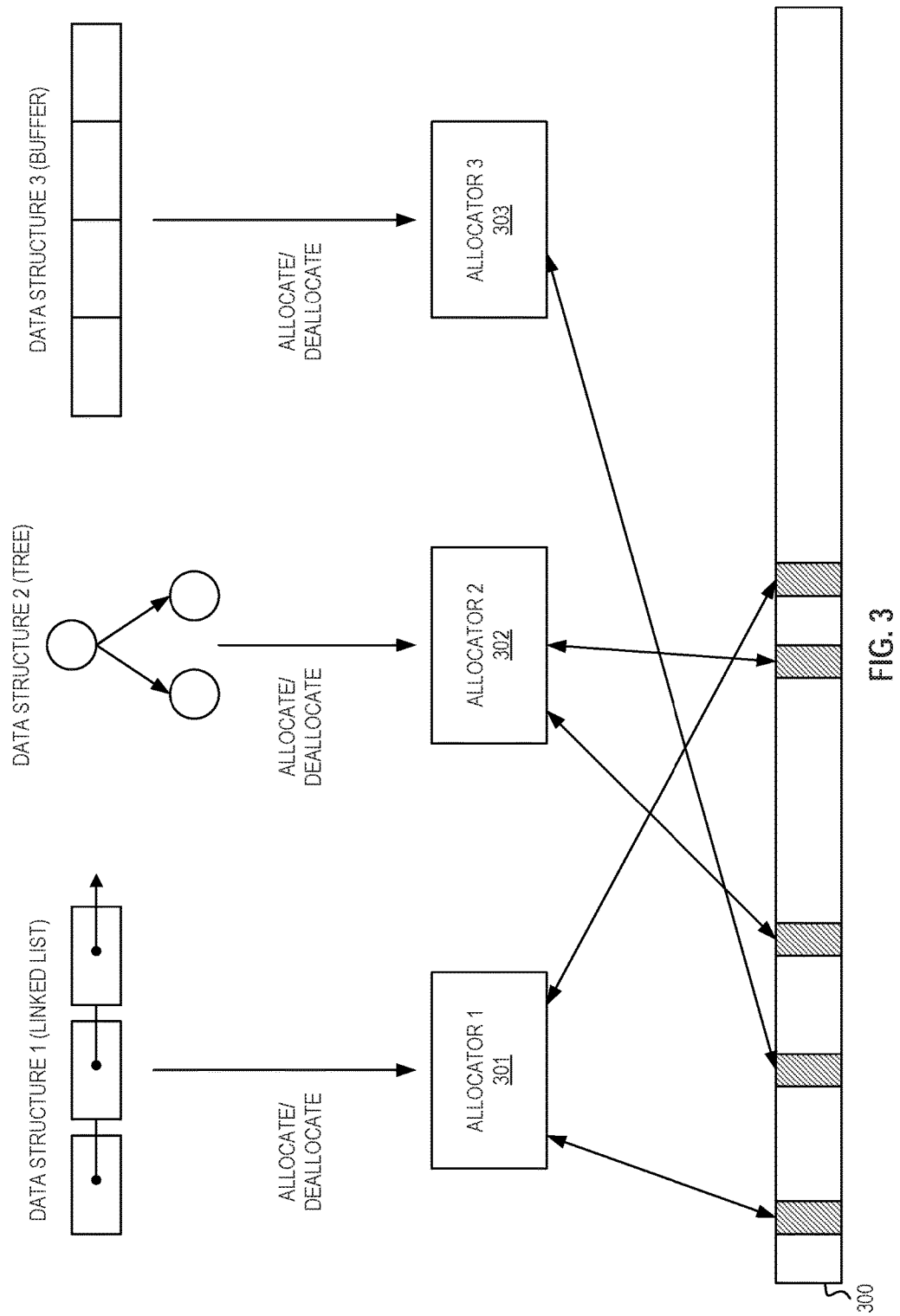
FIG. 3 illustrates a plurality of allocators according to embodiments of the disclosure.

FIG. 3 illustrates a plurality of allocators 301-303 according to embodiments of the disclosure. Memory 300 is a schematic view of a virtual address space. Each hashed section of memory 300 is a section of virtual address space assigned to a respective allocator according to the arrows. In one embodiment, an allocator is a hardware component. In another embodiment, an allocator is a software component. Certain embodiments of this disclosure allow the separation of data structures into disjoint regions of virtual memory. In one embodiment, all objects belonging to a data structure of interest are in a region or region belonging only to that data structure (e.g., no other object can lie in that region). For example, an allocator (e.g., hardware or the memory management module in a program) uses a different allocator for each data structure of interest. All calls to allocate and de-allocate objects belonging to every such data structure may thus be directed to the allocator managing the memory for that data structure. The three data structures depicted in FIG. 3 are merely examples. Multiple data structures may be of a same type (e.g., a plurality of linked lists). In FIG. 3, each data structure uses a different allocator to allocate or de-allocate memory for its objects, that is, the assignment of region of virtual memory to each allocator to manage. In one embodiment, sections (e.g., in FIG. 3, each hashed region of allocated space may be several gigabytes to terabytes) of the virtual address space are assigned to the allocators to manage. An allocator may further carve the virtual address space into objects on demand. The actual amount of the section (e.g., slice) that is used by the allocator may depend on the amount of (e.g., physical) memory actually consumed by the data structure. As one example, only a small region of the allocated region is to be consumed (e.g., used) by the allocator. In one embodiment, an operating system implements lazy mapping such that there is no physical memory associated with untouched parts of any region. In an embodiment where an allocator uses up all of its initial region (e.g., slice), an allocator may be given a region or regions (e.g., as shown for allocator 1(301) and allocator 2(302) in FIG. 3). This scheme is in contrast to a different mode of operation where a single allocator is shared by all data structures. The result of multiple allocators may be an efficient way to place different data structures in disjoint regions of virtual memory. In one embodiment, each region (e.g., slice) may be relatively large (e.g., on the order of terabytes), without actually occupying that much physical memory, so that the number of virtual addresses occupied by a data structure may be relatively small. In one embodiment, an operating system includes a mechanism to support allocating large chunks of virtual addresses without actually allocating backing physical memory, for example, allocation of physical memory lazily by distinguishing a minor page fault from a major page fault in this context. In one embodiment, a major page fault happens when a page corresponding to a virtual address is external from cache and system memory (e.g., it is instead "on disk") and needs an I/O device to fetch. In one embodiment, a minor page fault happens when the backing page has simply not been allocated. Minor page faults may be quickly serviced by allocating a page of system memory (e.g., DRAM) without use of any I/O devices.

Certain embodiments of this disclosure include a way to specify through hardware the virtual memory region or regions that are to be monitored. Two example embodiments of this are in FIGS. 4 and 8.

Figure 4:
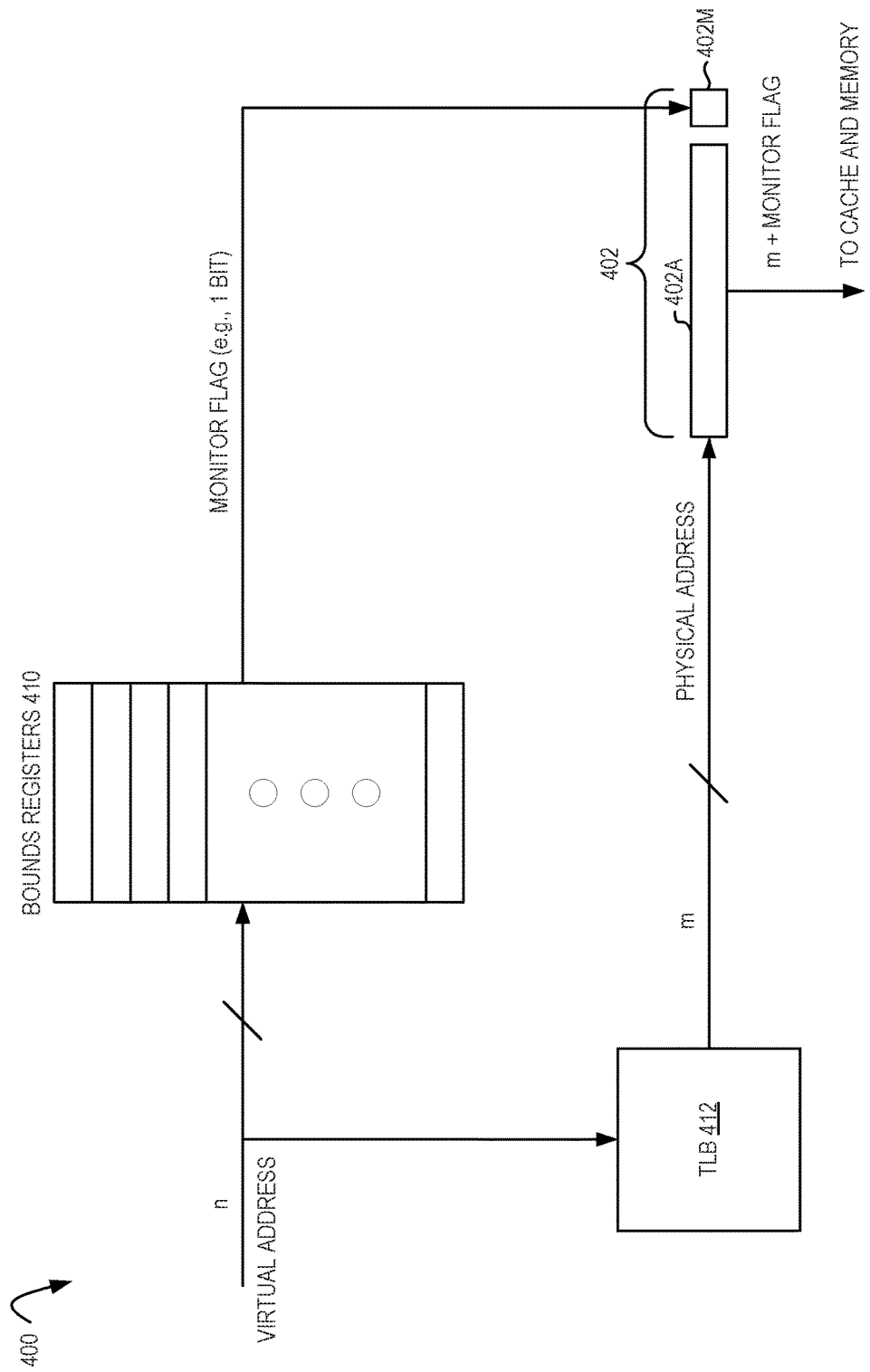
FIG. 4 illustrates a hardware circuit with bounds registers according to embodiments of the disclosure.

FIG. 4 illustrates a hardware circuit 400 with bounds registers 410 according to embodiments of the disclosure. In this embodiment, a virtual address for a memory access request is received and compared to a bound register or registers. In one embodiment, bounds register(s) includes a lower and upper bounds for (e.g., each) region of virtual memory that is to be monitored, e.g., by a performance monitoring unit. In one embodiment, two bound registers may be utilized for each region, e.g., an upper bound register and a lower bound register. An embodiment of this is discussed below in reference to FIG. 5. Hardware circuit 400 may include one or more comparators (not depicted) to compare an input virtual address to the active bounds register(s) (e.g., an upper bound register and a lower bound register) to determine if that input virtual address falls within a range (e.g., including the addresses at the upper and lower bounds) of a virtual memory region that is to be protected. In the depicted embodiment, the output of a match of the input virtual address (e.g., from an execution unit) to a virtual memory region in the bounds registers 410 is to set (e.g., high) a monitor flag. This flag is then to be associated with the physical address that corresponds to the input virtual address. In FIG. 4, translation lookaside buffer (e.g., TLB 412) (or other circuit) converts a virtual address corresponding (e.g., mapped) to a physical address 402A (e.g., of the system memory). TLB 412 outputs the physical address corresponding to the input virtual address. That physical address 402A may then have a monitor flag 402M appended to it, e.g., set to a 1 when the corresponding input virtual address is in a virtual address region (or is in one of multiple virtual address regions) that is to be monitored. The value 402 (e.g., combined physical address 402A and monitor flag 402M) may then be passed into a cache and/or memory circuit for access of the physical address, for example, value 402 may be input into hardware circuit 200 in FIG. 2 as value 202.

Figure 5:
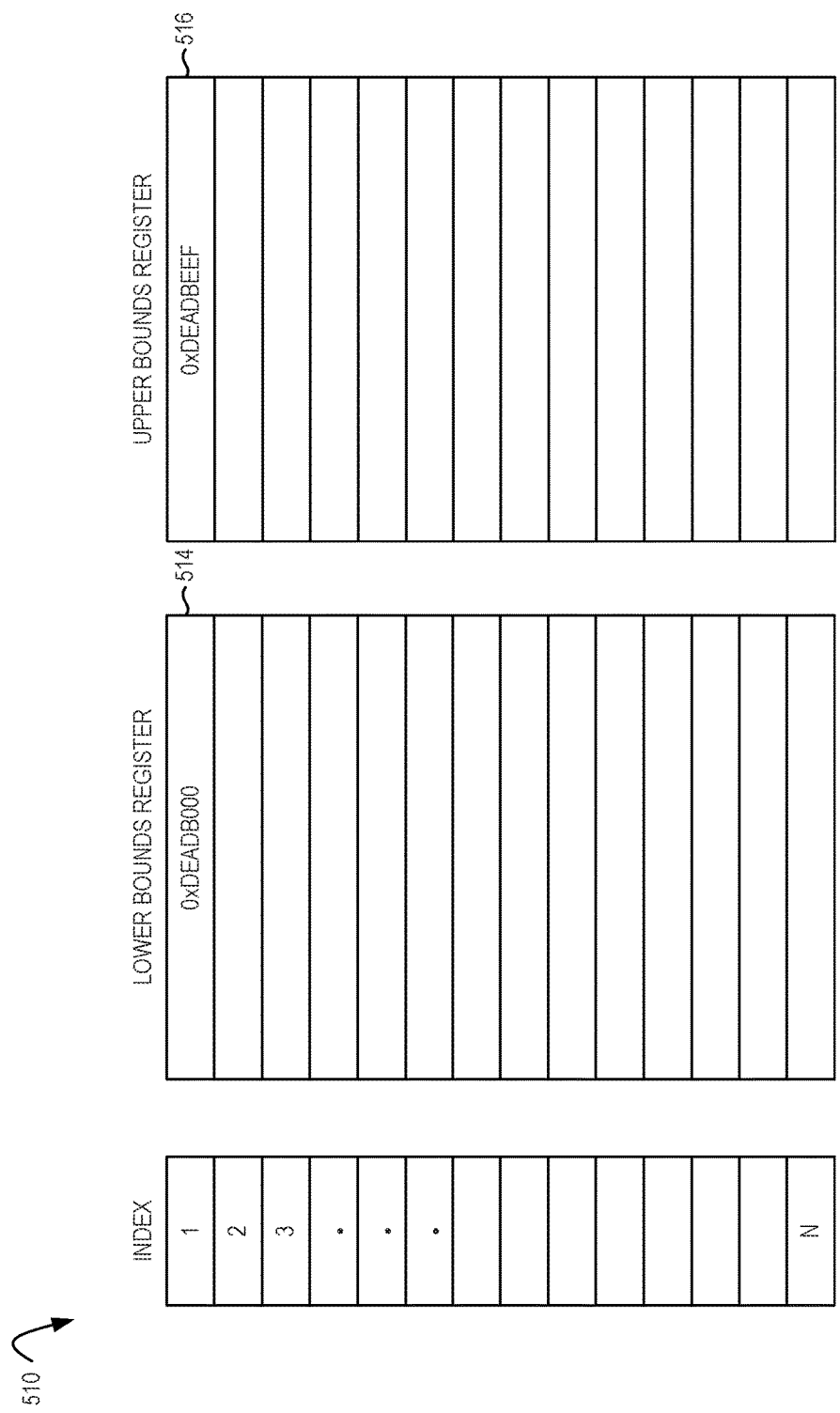
FIG. 5 illustrates lower and upper bounds registers according to embodiments of the disclosure.

FIG. 5 illustrates lower and upper bounds registers 510 according to embodiments of the disclosure. Although the registers are shown as multiple columns in this Figure, a single column may be used, e.g., with one of an upper and a lower bound for a region stored in a first of a pair of adjacent registers and the other stored in the second of the pair of adjacent registers. These registers may be referred to as fixed, hardware visible bounds registers. Each pair of bounds registers thus may identify a contiguous region of the virtual address space. In one embodiment, the regions identified by different pairs of bounds registers must be non-overlapping. A region checking circuit (not depicted) may be included to ensure that none of the regions overlap, e.g., and send a fault or error message when there is an overlap. Each of an upper and a lower bound register may be identified by an index, e.g., FIG. 5 shows N number of bounds registers with indices ranging from 1 to N. In one embodiment, each bounds register includes a lower bound and an upper bound, e.g., such that a bounds register marks the regions of virtual memory in the interval [Lower Upper]. For example, FIG. 5 illustrates the cases where BoundsRegisters[1].Lower=0xDEADB000 and BoundsRegisters[1].Upper=0xDEADBEEF. The bounds register therefore marks the range of addresses from 0xDEADB000 (e.g., in lower bound register 514) to 0xDEADBEEF (e.g., in upper bound register 516), both inclusive. In one embodiment, a processor executes an instruction to load both upper and lower bounds, e.g., for each region to be monitored. In one embodiment, a processor executes a first instruction to load the lower bound value into the lower bound register and a second instruction to load the upper bound value into the upper bound register, e.g., for each region to be monitored.

In one embodiment, a bounds register (e.g., one register with both the upper and lower bound values) or a pair of bound registers (e.g., collectively with the upper bound and lower bound values) is set to contain an empty range (e.g., not contain any range of virtual addresses to be monitored) by setting the upper range to a value smaller than a value in the lower range. In one embodiment, a bounds register (e.g., one register with both the upper and lower bound values) or a pair of bound registers (e.g., collectively with the upper and lower bound values) is set to the entire virtual address range by setting the lower bound value to zero and the upper bound value to the largest possible virtual address.

Figure 6:
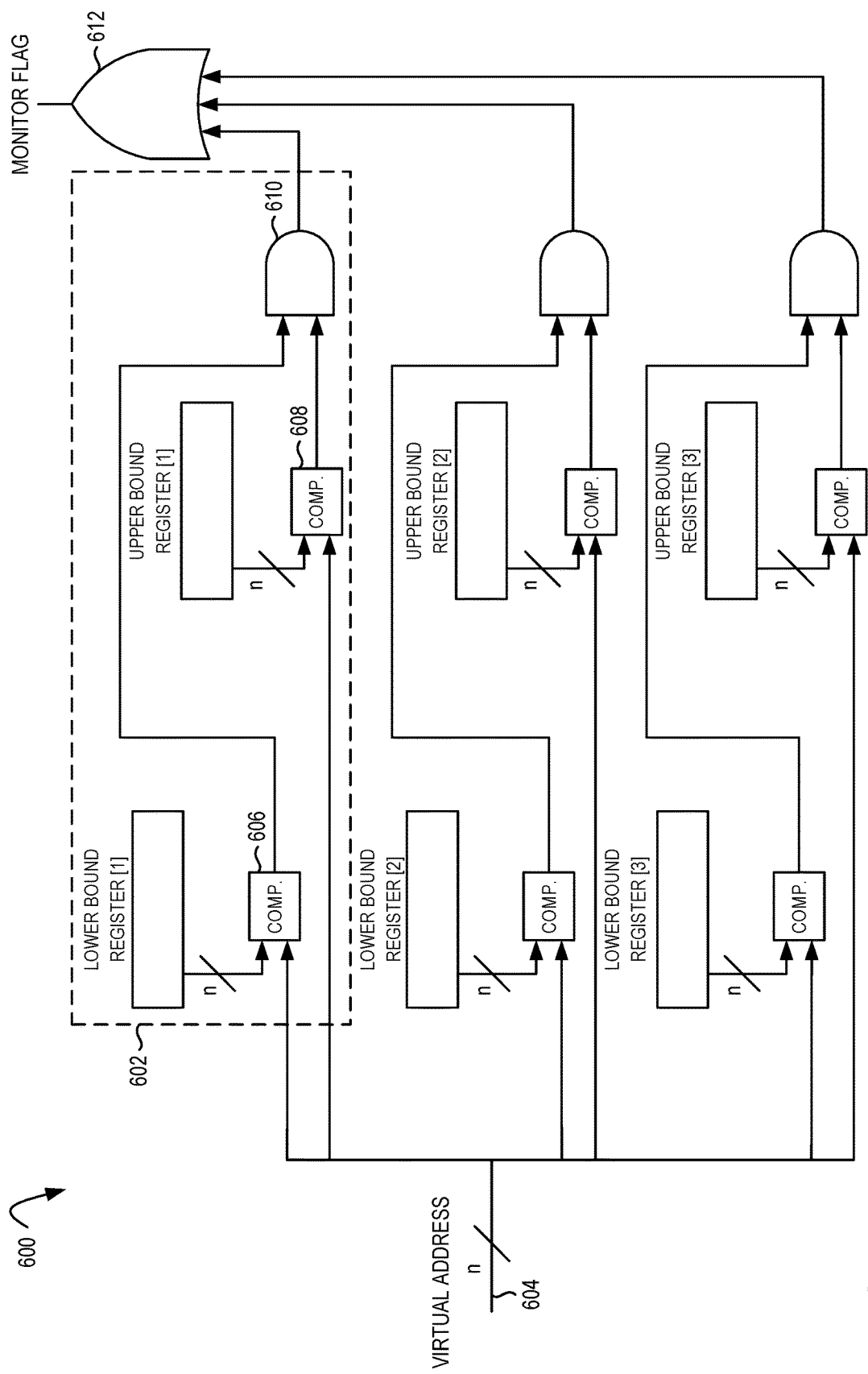
FIG. 6 illustrates a lower and upper bounds checking circuit according to embodiments of the disclosure.

FIG. 6 illustrates a lower and upper bounds checking circuit 600 according to embodiments of the disclosure. A pair (e.g., pair 602) of lower and upper bounds registers may be two registers as depicted, or two values packed into a single register (not depicted). A virtual address for a memory access request is received and compared to multiple bounds registers. Although three pairs of bound registers are depicted, any plurality of pairs of bound registers may be utilized. The OR gate 612 is to output the monitor flag (e.g., set to true (high)) when any one of the pairs of lower and upper bounds registers indicate the input virtual address 604 falls within the range in a pair of lower and upper bounds registers. Pair 602 of lower and upper bounds registers may each go to a comparator (e.g., comparator 606 to determine when the input virtual address 604 is greater than (or equal to) the lower bound value in lower bound register[1] and comparator 608 to determine when the input virtual address 604 is less than (or equal to) the upper bound value in upper bound register[1]) and output a value indicating true (e.g., a logic one) or false (e.g., a logic zero) to AND gate 610, accordingly. Thus AND gate 610 is to output a value to output a true monitor flag (e.g., to indicate that the input linear address 604 lies within the range of the pair 602 of lower and upper bound registers) when both inputs are true. In one embodiment, circuit 600 may replace bounds registers 410 in FIG. 4. The other pairs (if utilized) may each perform the same check for their range of virtual address regions as discussed herein.

Figure 7:
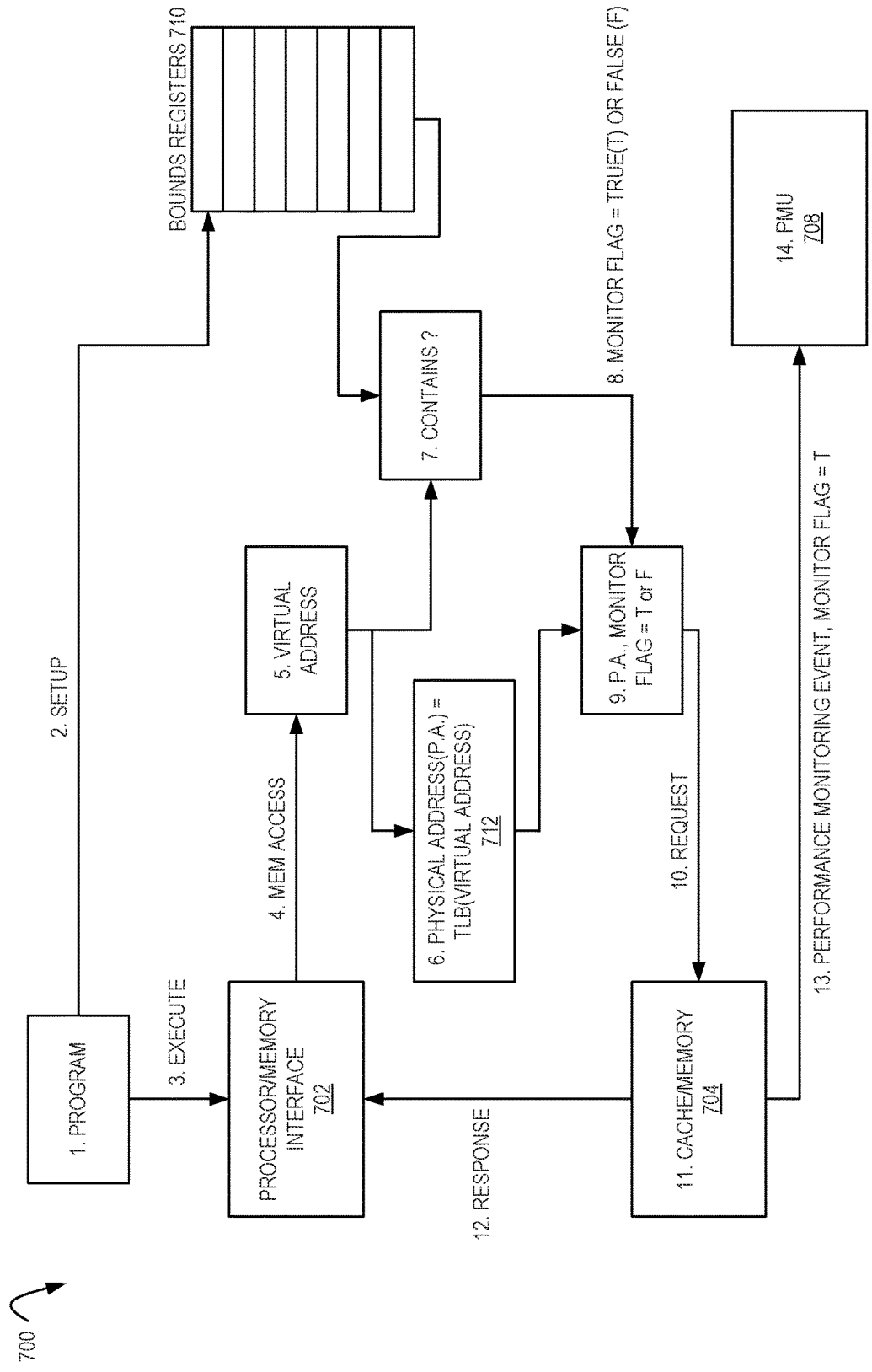
FIG. 7 illustrates a flow schematic for performance monitoring with bounds registers according to embodiments of the disclosure.

FIG. 7 illustrates a flow schematic 700 according to embodiments of the disclosure. The flow includes a program (1) executing on a processor. The events that will be monitored by the performance monitoring unit 708 (PMU) are input or setup (2), e.g., via the program and/or hardware. The values in the bounds registers are to be input, e.g., via the program and/or hardware, for the virtual memory region or regions to be monitored. During execution (3), the processor and/or memory interface 702 generates a memory access (4) request that includes a virtual address to be accessed (5). This virtual address is translated (e.g., through the Translation Lookaside Buffer 712 (TLB) into a physical address (P.A.) (6). The virtual address (e.g., in parallel with the TLB translation) is compared (7) to all (e.g., active) bounds registers 710. If the virtual address is contained by any of the ranges described by the bounds registers then a true (T) monitor flag is emitted or a false (F) monitor flag is emitted (8). This combination of physical address and monitor flag (e.g., match status) (9) is supplied as the request (10) to the cache/memory (e.g., DRAM) 704 subsystem for servicing (11). The cache/memory 704 subsystem sends a completion response (12) to the processor and/or memory interface 702 when it has completed processing of the request. During processing, the memory access may generate a PMU event (13). The event is passed (14) to the PMU 708, e.g., for tracking the event, if and only if the associated monitor flag is set to true. The PMU may be a performance monitoring circuit.

In one embodiment, in order to use the circuit described above to restrict events to data structures of interest, the circuit and/or programmer is to ensure that all objects belonging to the data structure of interest are placed in the virtual memory region described by the bounds registers. For example in the case of the database example referred to above, the circuit and/or programmer is to follow these steps: 1) use a (respective) memory allocator for objects belonging to the index, 2) query the memory allocator to obtain the virtual address range being used (e.g., an index stored in the virtual address range of 0xDEADB000 to 0xDEADBEEF in FIG. 5), and 3) set up the bounds register (e.g., the bounds registers 1 as in FIG. 5). In one embodiment, the remaining bounds registers are set up to contain an empty range, e.g., by setting the upper bound value to a smaller value than the lower bound value. Certain embodiments may ensure any performance monitoring events (e.g., cache accesses or cache misses) are only counted for a desired region of linear addresses (e.g., only for access requests (or accesses) to the single data structure (e.g., an index) stored in the virtual range of 0xDEADB000 to 0xDEADBEEF in FIG. 5).

Figure 8:
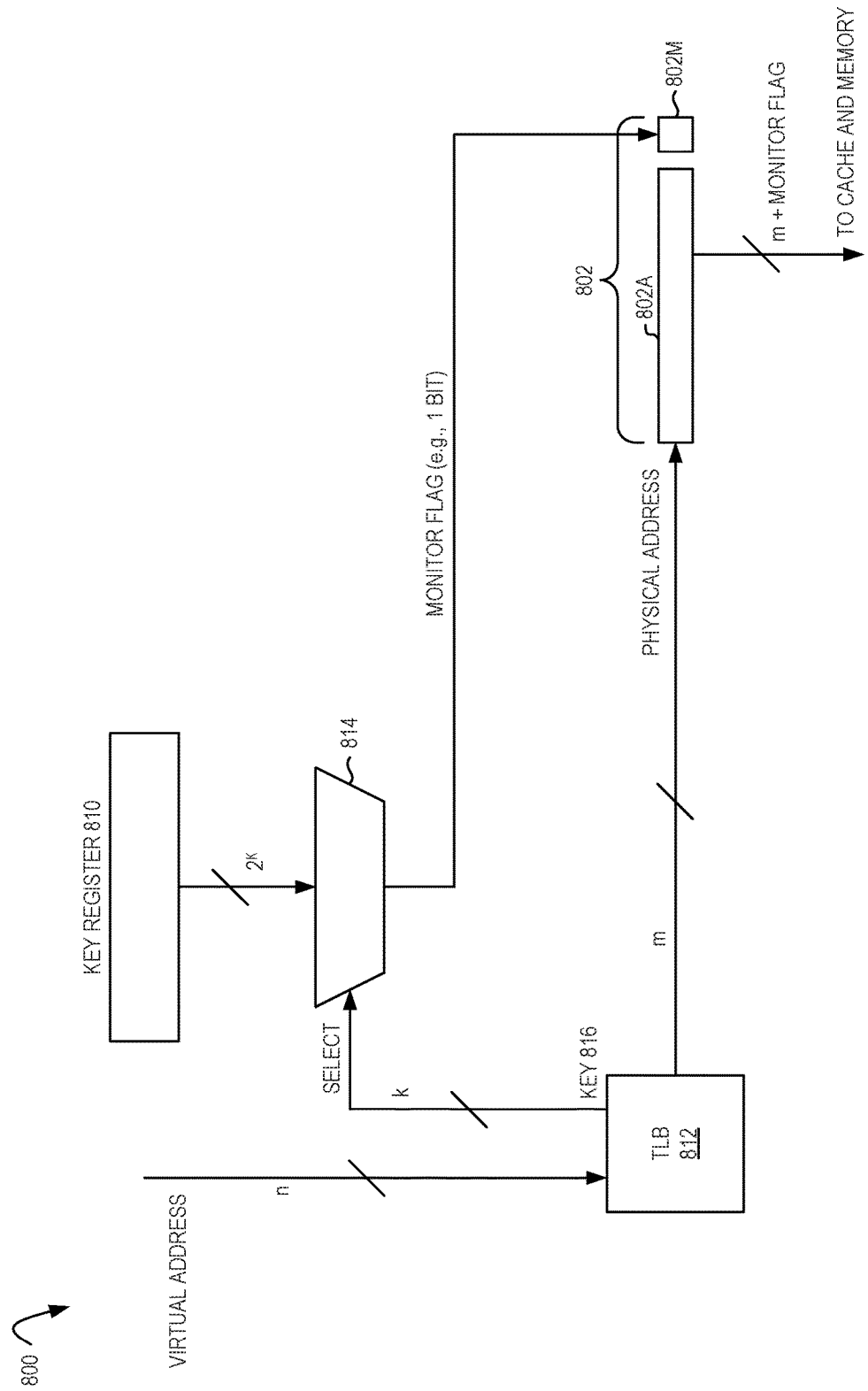
FIG. 8 illustrates a hardware circuit with a key register according to embodiments of the disclosure.

Turning to another embodiment to specify through hardware the virtual memory region or regions that are to be monitored, FIG. 8 illustrates a hardware circuit 800 with a key register 810 according to embodiments of the disclosure. Hardware circuit 800 includes associated protection keys with each virtual page of the TLB 812. A protection key generally refers to a fixed number of bits associated with each virtual page that lives in the corresponding page table entry. The protection key bits index into a fixed set of registers (e.g., key register 810). Each register may add properties to any page that points to it and specifies whether to monitor accesses to that page for events. In one embodiment, a protection key is included in a page table, for example, such that a protection key for the page containing the accessed memory virtual address is loaded into the TLB, e.g., the first time that the page is accessed.

For example, circuit 800 includes an input virtual address for a memory access request. In FIG. 8, translation lookaside buffer (e.g., TLB) 812 (or other circuit) converts a virtual address corresponding (e.g., mapped) to a physical address 802A (e.g., of the system memory). TLB 812 outputs the physical address corresponding to the input virtual address. In the depicted embodiment, a match of the input virtual address (e.g., from an execution unit) to one of the virtual memory addresses in a region is to set (e.g., high) a monitor flag. This flag is then to be associated with the physical address that corresponds to the input virtual address. For example, TLB may include a protection key 816. A protection key for each virtual address (e.g., on a page by page basis) may be included in key register 810. Protection key may indicate if the address is one of the range that is to be monitored (e.g., by PMU). Key 816 may be used as an index input into mux 814 (or other selection circuit) to pull the properties for that key, for example, the property here to be examined is if any address on that page is to be monitored for events (e.g., by PMU). If true, the mux (or other circuit) may output a monitor flag. That physical address 802A may then have a monitor flag 802M appended to it, e.g., set to a 1 when the corresponding input virtual address is in a virtual address region (or is in one of multiple virtual address regions) that is to be monitored. The value 802 (e.g., combined physical address 802A and monitor flag 802M) may then be passed into a cache and/or memory circuit for access of the physical address, for example, value 802 may be input into hardware circuit 200 in FIG. 2 as value 202. In one embodiment, if the virtual address is not in the TLB (e.g., it is a miss), the TLB may perform a page table walk to fill from the system (e.g., main) memory and the main memory may also include a copy of the protection key (e.g., for the data structure) for the virtual address.

Figure 9:
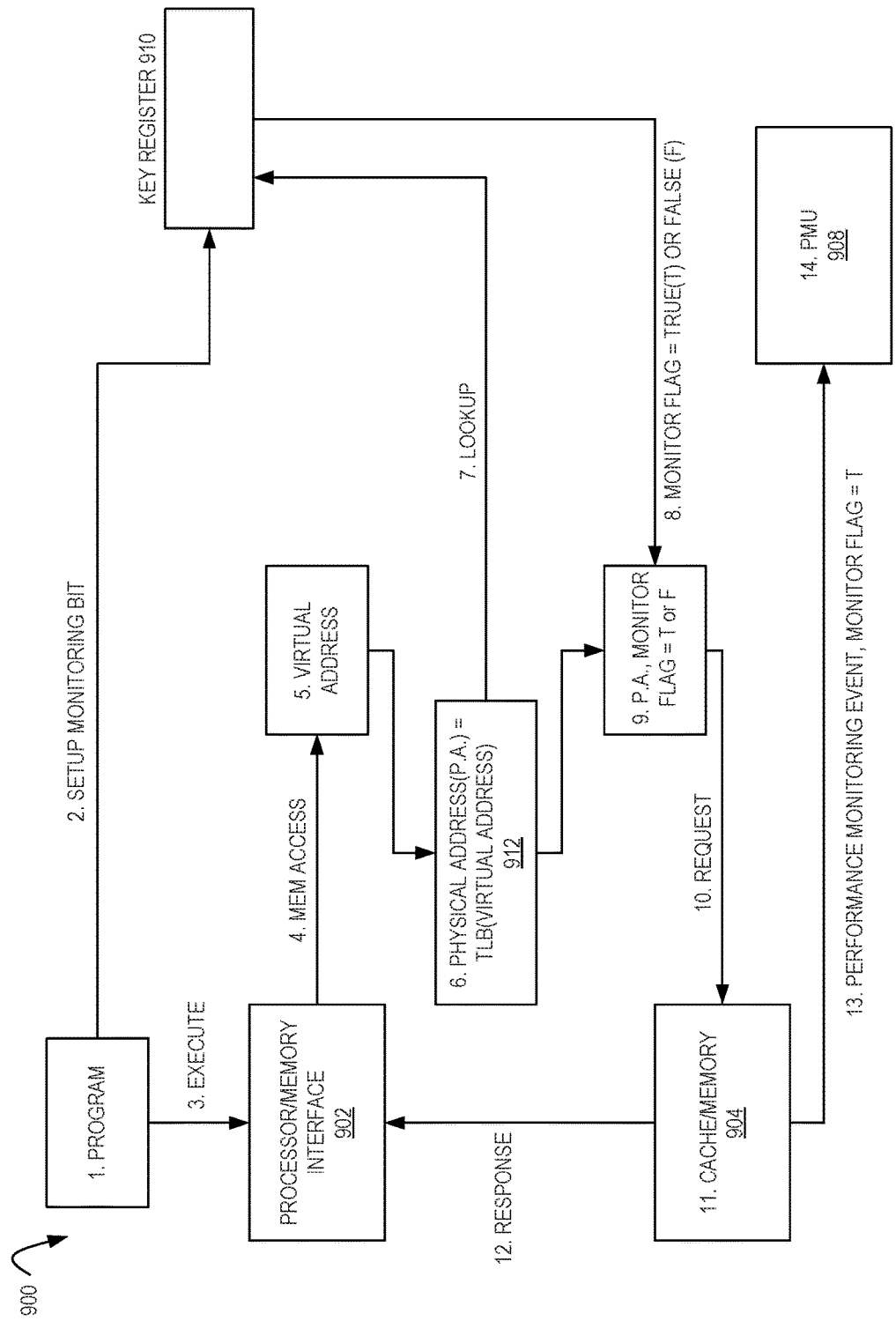
FIG. 9 illustrates a flow schematic for performance monitoring with a key register according to embodiments of the disclosure.

FIG. 9 illustrates a flow schematic 900 according to embodiments of the disclosure. The flow includes a program (1) executing on a processor. The events that will be monitored by the performance monitoring unit 908 (PMU) are input, e.g., via the program and/or hardware. The values in the key register 910 are to be input or setup (2), e.g., via the program and/or hardware, for the virtual memory region or regions to be monitored. For example, the key register 910 may include a monitor flag (e.g., bit) for each possible key to specify whether monitoring is desired for the pages with that key. During execution (3), the processor and/or memory interface 902 generates a memory access request (4) request that includes a virtual address to be accessed (5). This virtual address is translated (e.g., through the Translation Lookaside Buffer 912 (TLB)) into a physical address (P.A.) (6). In addition, the TLB contains the protection key loaded from the page table entry. This protection key is used to index into the key register 910 to perform a lookup and locate the corresponding monitor flag (e.g., bit) (7). If the protection key for the TLB page that includes the virtual address has a set (e.g., high) monitor flag, the flag is output (8). This combination of physical address and monitor flag (e.g., match status) (9) is supplied as the request (10) to the cache/memory (e.g., DRAM) 904 subsystem for servicing (11). The cache/memory 904 subsystem sends a completion response (12) to the processor and/or memory interface 902 when it has completed processing of the request. During processing, the memory access may generate a PMU event (13). The event is passed to the PMU 908 (14), e.g., for tracking the event, if and only if the associated monitor flag is set to true.

In one embodiment, in order to use the circuit described above to restrict events to data structures of interest, the circuit and/or programmer is to ensure that all objects belonging to the data structure of interest are placed in the virtual memory region described by a key index as being monitored. In one embodiment, the memory allocator managing the data structure of interest is to mark all pages in its virtual memory regions with a unique key to indicate those virtual addresses (and none that do not have a key that indicates monitoring) are to be monitored.

For example, in the case of the database example referred to above, the circuit and/or programmer is to follow these steps: 1) use a (respective) memory allocator for objects belonging to the index, 2) query the memory allocator to obtain the virtual address range being used (e.g., an index stored in the virtual address range of 0xDEADB000 to 0xDEADBEEF in FIG. 5), 3) request that all page table entries for pages in this range (one or more pages) have a protection key set to a chosen value, and 4) set the corresponding monitor field in the key register to true. Certain embodiments may ensure any performance monitoring events (e.g., cache accesses or cache misses) are only counted for a desired region of linear addresses (e.g., only for access requests (or accesses) to the single data structure (e.g., an index) stored in the virtual range of 0xDEADB000 to 0xDEADBEEF in FIG. 5).

Certain embodiments herein compare the address of every memory operation to determine if a monitor bit is set. Certain embodiments herein add zero latency to memory operations. Certain embodiments herein merely require the addition of a monitoring bit per key to the key register. Certain embodiments herein allow monitoring to be easily turned on and off for different data structures. In one embodiment with a bound register(s), this may include changing the value(s) of the appropriate bound register(s). In one embodiment with protection keys, this may include changing (e.g., flipping a bit) the appropriate monitor flag in the key register. In certain embodiments, key register and/or bound register values are part of the executing process on a processor and should be saved on a context switch, e.g., and the key register and/or bound register values belonging to the newly scheduled process need to be restored.

Figure 10:
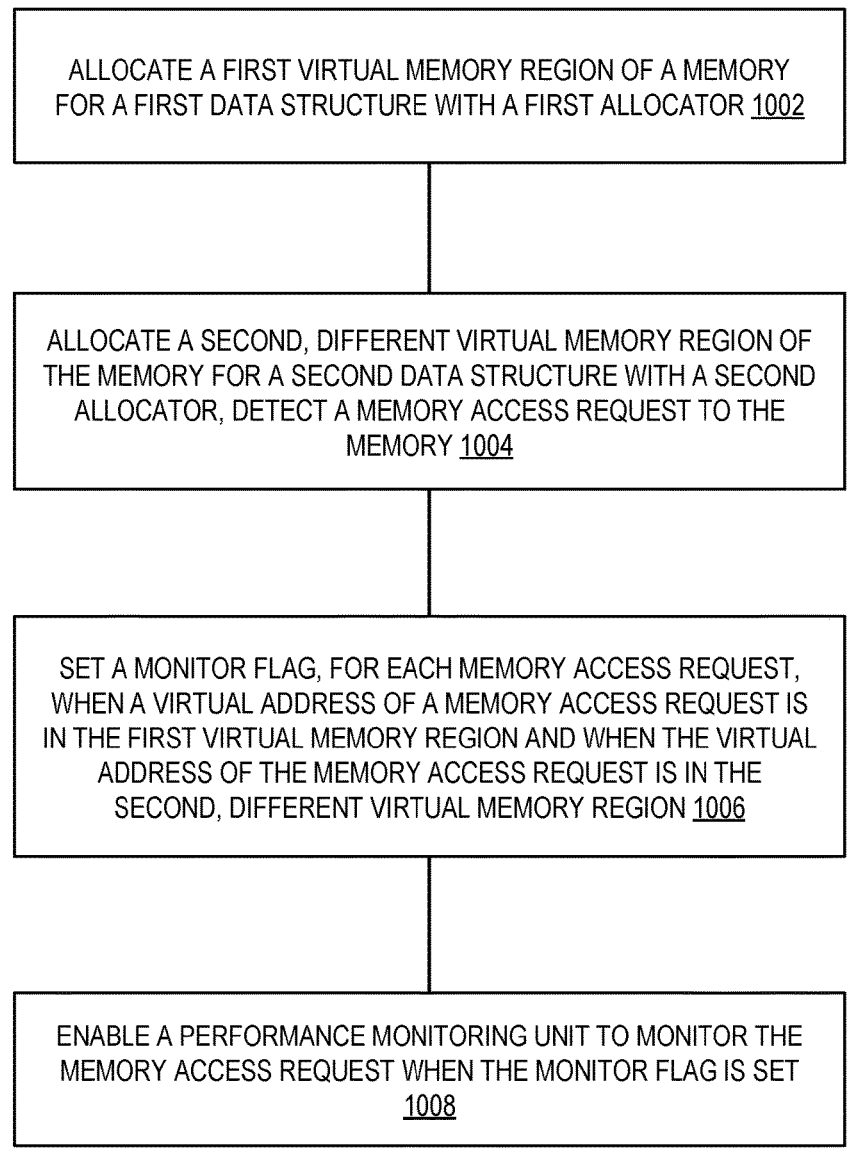
FIG. 10 illustrates a flow diagram for performance monitoring according to embodiments of the disclosure.

FIG. 10 illustrates a flow diagram according to embodiments of the disclosure. Flow 1000 includes allocating a first virtual memory region of a memory for a first data structure with a first allocator, at 1002, allocating a second, different virtual memory region of the memory for a second data structure with a second allocator, detecting a memory access request to the memory, at 1004, setting a monitor flag, for each memory access request, when a virtual address of a memory access request is in the first virtual memory region and when the virtual address of the memory access request is in the second, different virtual memory region, at 1006, and enabling a performance monitoring unit to monitor the memory access request when the monitor flag is set, at 1008.

In one embodiment, a processor includes at least one core; a performance monitoring unit; and a memory management unit comprising a first allocator to allocate a first virtual memory region of a memory for a first data structure, and a second allocator to allocate a second, different virtual memory region of the memory for a second data structure, wherein the memory management unit is to, for each memory access request from the at least one core, set a monitor flag when a virtual address of a memory access request is in the first virtual memory region and set the monitor flag when the virtual address of the memory access request is in the second, different virtual memory region, and enable the performance monitoring unit to monitor the memory access request when the monitor flag is set. The processor (e.g., a memory management unit thereof) may translate the virtual address of the memory access request to a physical address and append the monitor flag to the physical address when the virtual address is in either of the first virtual memory region and the second, different virtual memory region. The processor may include a first lower bound register to set a lower bound of the first virtual memory region and a first upper bound register to set an upper bound of the first virtual memory region, wherein the memory management unit is to set the monitor flag for the virtual address of the memory access request that is one of between the lower bound and the upper bound, at the lower bound, and at the upper bound. The processor may include a translation lookaside buffer (TLB), wherein the TLB is to translate the virtual address of the memory access request to a physical address in parallel with a check by the memory management unit if the virtual address of the memory access request is one of between the lower bound and the upper bound, at the lower bound, and at the upper bound. The processor (e.g., memory management unit) may set a second lower bound register and a second upper bound register to contain an empty range when a value in the second upper bound register is smaller than a value in the second lower bound register. The processor (e.g., memory management unit) may include a translation lookaside buffer (TLB) comprising a protection key for a page of a page table, wherein the TLB is to translate the virtual address of the memory access request to a physical address and to set the monitor flag when the page includes the virtual address of the memory access request and the protection key indexes into a key register that indicates the virtual address of the memory access request is to be monitored. The processor (e.g., memory management unit) may save the monitor flag on a context switch. The processor (e.g., memory management unit) may enable the performance monitoring unit to monitor the memory access request for the virtual address when the monitor flag is set and the memory access request is to generate a performance monitoring event.

In another embodiment, a method includes allocating a first virtual memory region of a memory for a first data structure with a first allocator; allocating a second, different virtual memory region of the memory for a second data structure with a second allocator; detecting a memory access request to the memory; setting a monitor flag, for each memory access request, when a virtual address of a memory access request is in the first virtual memory region and when the virtual address of the memory access request is in the second, different virtual memory region; and enabling a performance monitoring unit to monitor the memory access request when the monitor flag is set. The method may include translating the virtual address of the memory access request to a physical address; and appending the monitor flag to the physical address when the virtual address is in either of the first virtual memory region and the second, different virtual memory region. The method may include storing a lower bound value in a first lower bound register to set a lower bound of the first virtual memory region and an upper bound value in a first upper bound register to set an upper bound of the first virtual memory region, wherein the setting comprises setting the monitor flag for the virtual address of the memory access request that is one of between the lower bound and the upper bound, at the lower bound, and at the upper bound. The method may include translating the virtual address of the memory access request to a physical address with a translation lookaside buffer (TLB) in parallel with checking if the virtual address of the memory access request is one of between the lower bound and the upper bound, at the lower bound, and at the upper bound. The method may include setting a value in a second upper bound register to be smaller than a value in a second lower bound register to indicate an empty range. The method may include translating the virtual address of the memory access request to a physical address with a translation lookaside buffer (TLB) comprising a protection key for a page of a page table; wherein the setting comprises setting the monitor flag when the page includes the virtual address of the memory access request and the protection key indexes into a key register that indicates the virtual address of the memory access request is to be monitored. The method may include saving the monitor flag on a context switch. The enabling may include enabling the performance monitoring unit to monitor the memory access request when the monitor flag is set and the memory access request is to generate a performance monitoring event.

In yet another embodiment, a non-transitory machine readable medium that stores code that when executed by a machine causes the machine to perform a method that includes allocating a first virtual memory region of a memory for a first data structure with a first allocator; allocating a second, different virtual memory region of the memory for a second data structure with a second allocator; detecting a memory access request to the memory; setting a monitor flag, for each memory access request, when a virtual address of a memory access request is in the first virtual memory region and when the virtual address of the memory access request is in the second, different virtual memory region; and enabling a performance monitoring unit to monitor the memory access request when the monitor flag is set. The method may include translating the virtual address of the memory access request to a physical address; and appending the monitor flag to the physical address when the virtual address is in either of the first virtual memory region and the second, different virtual memory region. The method may include storing a lower bound value in a first lower bound register to set a lower bound of the first virtual memory region and an upper bound value in a first upper bound register to set an upper bound of the first virtual memory region, wherein the setting comprises setting the monitor flag for the virtual address of the memory access request that is one of between the lower bound and the upper bound, at the lower bound, and at the upper bound. The method may include translating the virtual address of the memory access request to a physical address with a translation lookaside buffer (TLB) in parallel with checking if the virtual address of the memory access request is one of between the lower bound and the upper bound, at the lower bound, and at the upper bound. The method may include setting a value in a second upper bound register to be smaller than a value in a second lower bound register to indicate an empty range. The method may include translating the virtual address of the memory access request to a physical address with a translation lookaside buffer (TLB) comprising a protection key for a page of a page table; wherein the setting comprises setting the monitor flag when the page includes the virtual address of the memory access request and the protection key indexes into a key register that indicates the virtual address of the memory access request is to be monitored. The method may include saving the monitor flag on a context switch. The enabling may include enabling the performance monitoring unit to monitor the memory access request when the monitor flag is set and the memory access request is to generate a performance monitoring event.

In another embodiment, a processor includes at least one core; a performance monitoring means; means to allocate a first virtual memory region of a memory for a first data structure; means to allocate a second, different virtual memory region of the memory for a second data structure; and means to, for each memory access request from the at least one core, set a monitor flag when a virtual address of a memory access request is in the first virtual memory region and set the monitor flag when the virtual address of the memory access request is in the second, different virtual memory region, and means to enable the performance monitoring means to monitor the memory access request when the monitor flag is set.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of single instruction, multiple data (SIMD) extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, December 2015; and see Intel® Architecture Instruction Set Extensions Programming Reference, February 2016).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a central processing unit (CPU) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 11A is a block diagram illustrating both an exemplary in-order pipeline and an exemplary register renaming, out-of-order issue/execution pipeline according to embodiments of the disclosure. FIG. 11B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) unit 1136, which is coupled to an instruction fetch unit 1138, which is coupled to a decode unit 1140. The decode unit 1140 (or decoder or decoder unit) may decode instructions (e.g., macroinstructions), and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservation stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register map and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch unit 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 performs the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instruction sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect (e.g., ring) network 1202 and with its local subset of the Level 2 (L2) cache 1204, according to embodiments of the disclosure. In one embodiment, an instruction decode unit 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the disclosure may use a different approach (e.g., use a single register set or include a communication path that allows data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the disclosure. FIG. 12B includes an L1 data cache 1206A that is part of the L1 cache 1206 in FIG. 12A, as well as more detail regarding the vector unit 1210 of FIG. 12A and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
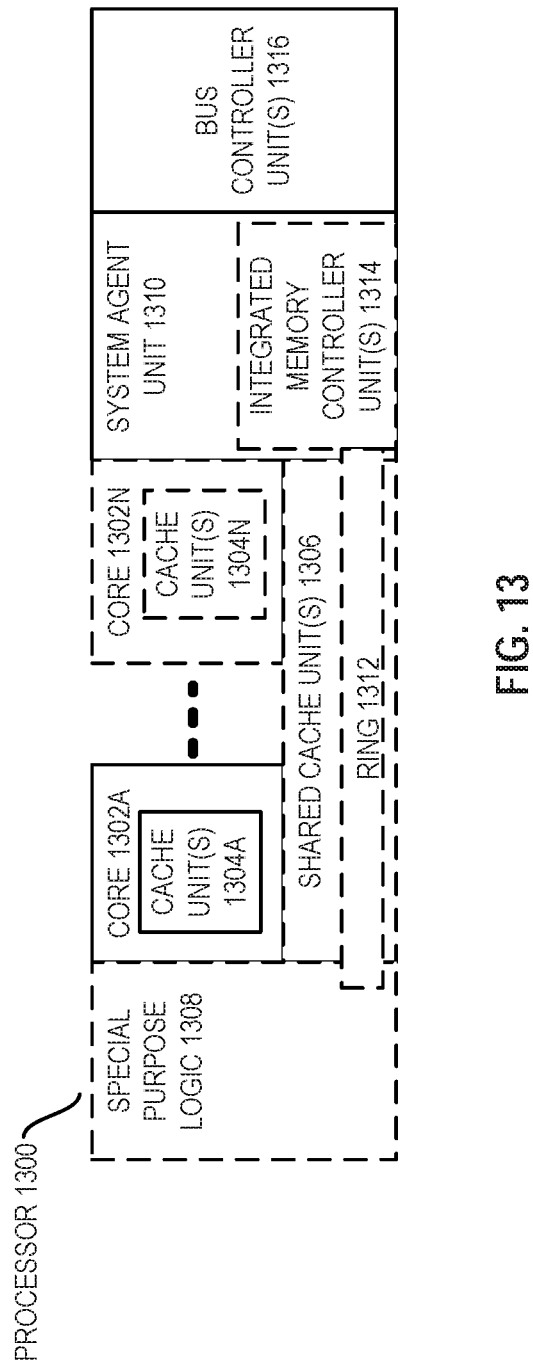
FIG. 13 is a block diagram of a processor that may have more than one core, may have an integrated memory controller, and may have integrated graphics according to embodiments of the disclosure.

FIG. 13 is a block diagram of a processor 1300 that may have more than one core, may have an integrated memory controller, and may have integrated graphics according to embodiments of the disclosure. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, bipolar complementary metal-oxide-semiconductor (BiCMOS), complementary metal-oxide-semiconductor (CMOS), or n-type metal-oxide-semiconductor (NMOS).

The memory hierarchy includes one or more levels of cache within the cores, a set of one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment, a ring based interconnect unit 1312 interconnects the special purpose (e.g., integrated graphics) logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multithreading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the special purpose (integrated graphics, e.g.) logic 1308. The display unit is for driving one or more externally connected displays.

The cores 1302A-N may be homogenous or heterogeneous in terms of architecture instruction set; that is, two or more of the cores 1302A-N may be capable of executing the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld personal computers (PCs), personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
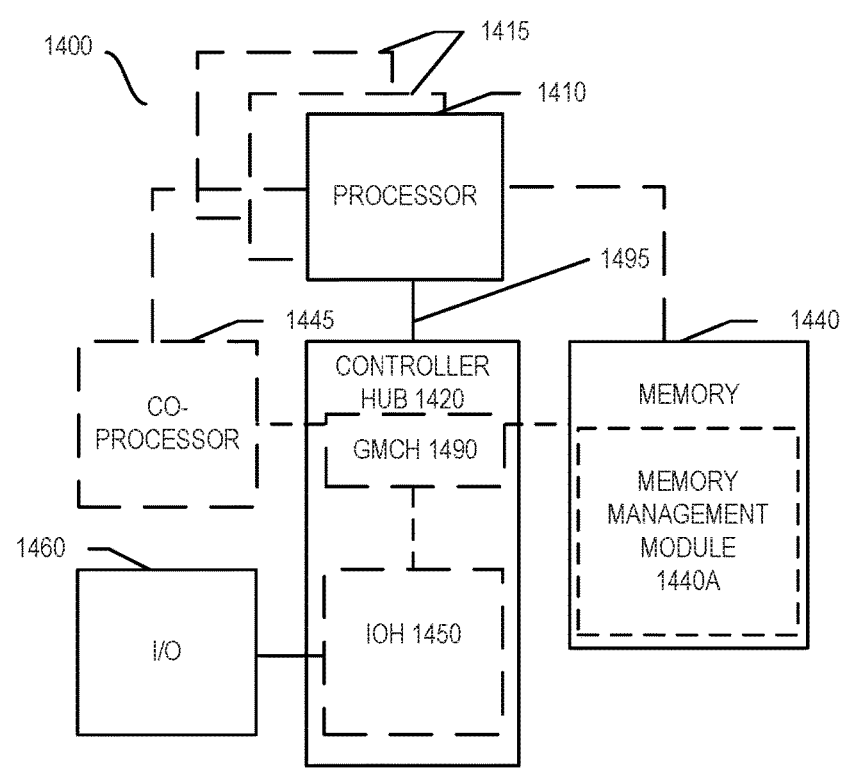
FIG. 14 is a block diagram of a system in accordance with one embodiment of the present disclosure.

Referring now to FIG. 14, shown is a block diagram of a system 1400 in accordance with one embodiment of the present disclosure. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 is on a single chip with the IOH 1450. Memory 1440 may include a memory management module 1440A, for example, to store code that when executed causes a processor to perform any method of this disclosure.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor 1445 accepts and executes the received coprocessor instructions.

Figure 15:
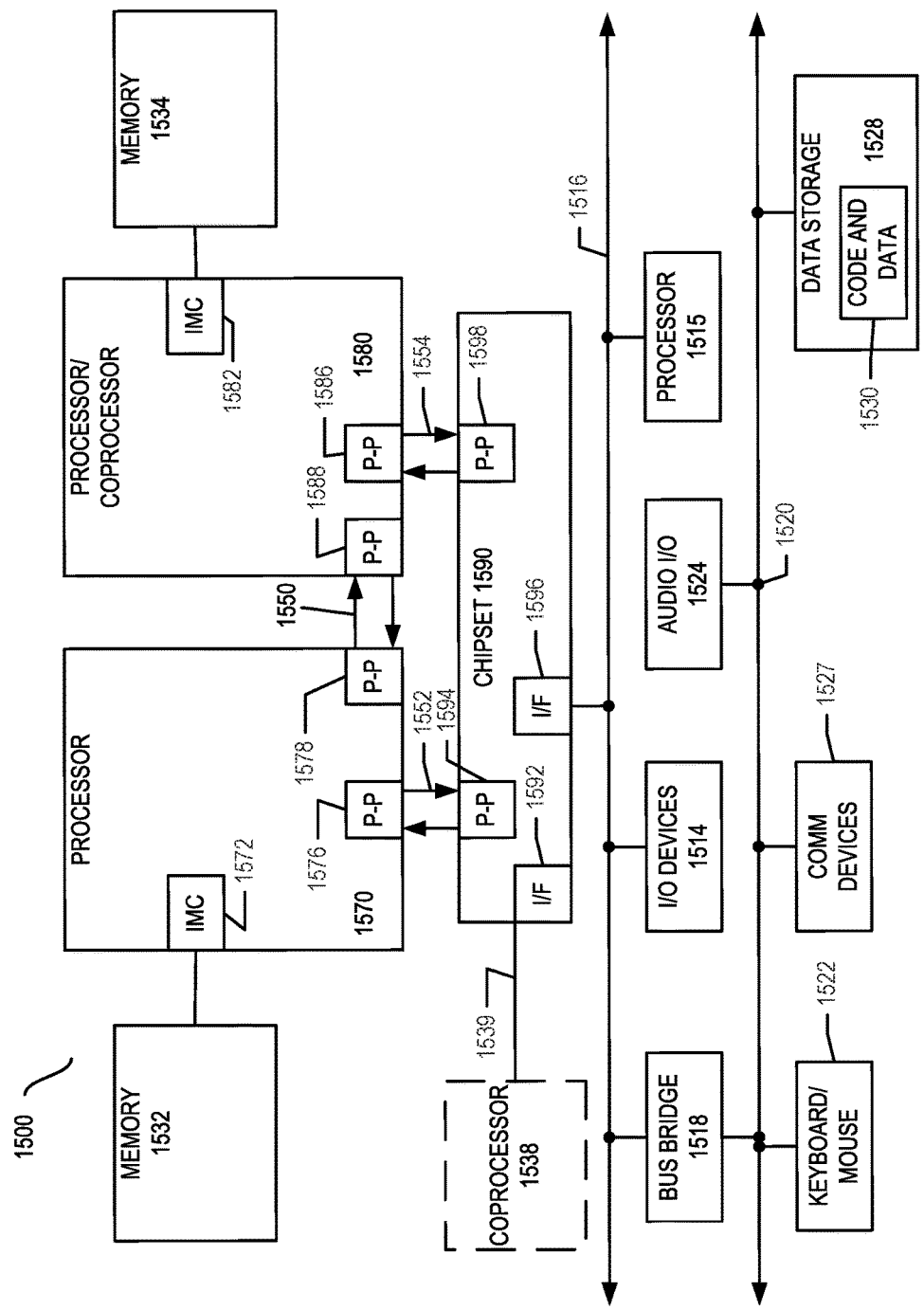
FIG. 15 is a block diagram of a more specific exemplary system in accordance with an embodiment of the present disclosure.

Referring now to FIG. 15, shown is a block diagram of a first more specific exemplary system 1500 in accordance with an embodiment of the present disclosure. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the disclosure, processors 1570 and 1580 are respectively processors 1410 and 1415, while coprocessor 1538 is coprocessor 1445. In another embodiment, processors 1570 and 1580 are respectively processor 1410 and coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a data storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
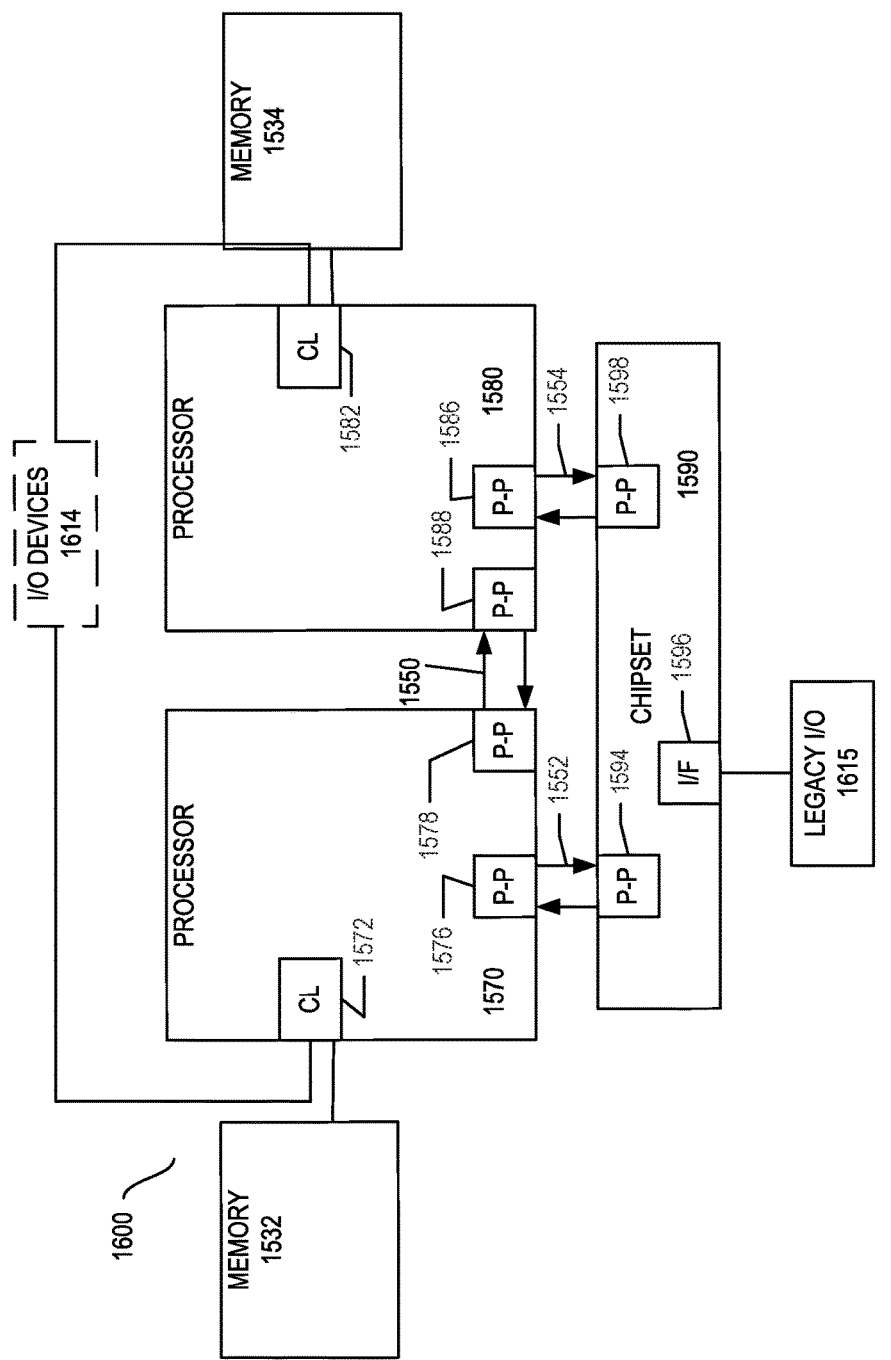
FIG. 16, shown is a block diagram of a second more specific exemplary system in accordance with an embodiment of the present disclosure.

Referring now to FIG. 16, shown is a block diagram of a second more specific exemplary system 1600 in accordance with an embodiment of the present disclosure. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
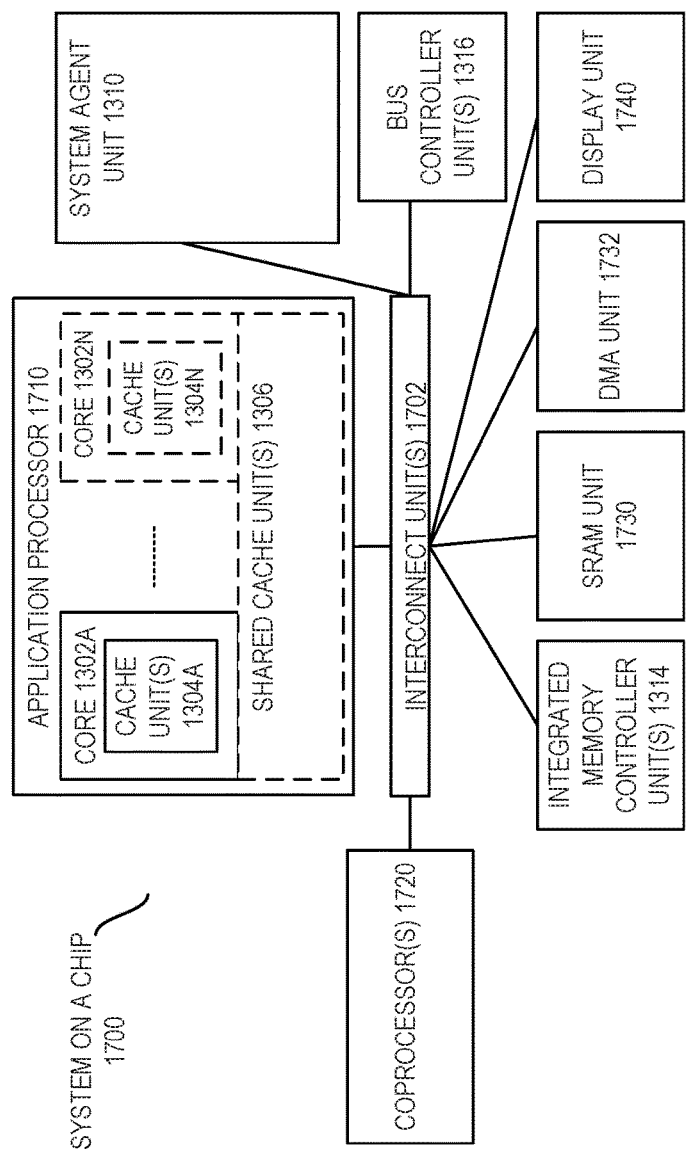
FIG. 17, shown is a block diagram of a system on a chip (SoC) in accordance with an embodiment of the present disclosure.

Referring now to FIG. 17, shown is a block diagram of a SoC 1700 in accordance with an embodiment of the present disclosure. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-1302N and shared cache unit(s) 1306; a system agent unit 1310; a bus controller unit(s) 1316; an integrated memory controller unit(s) 1314; a set of one or more coprocessors 1720 which may include integrated graphics logic, an image processor, an audio processor, and a video processor; a static random access memory (SRAM) unit 1730; a direct memory access (DMA) unit 1732; and a display unit 1740 for coupling to one or more external displays. In one embodiment, the coprocessor(s) 1720 include(s) a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example: a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine, causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
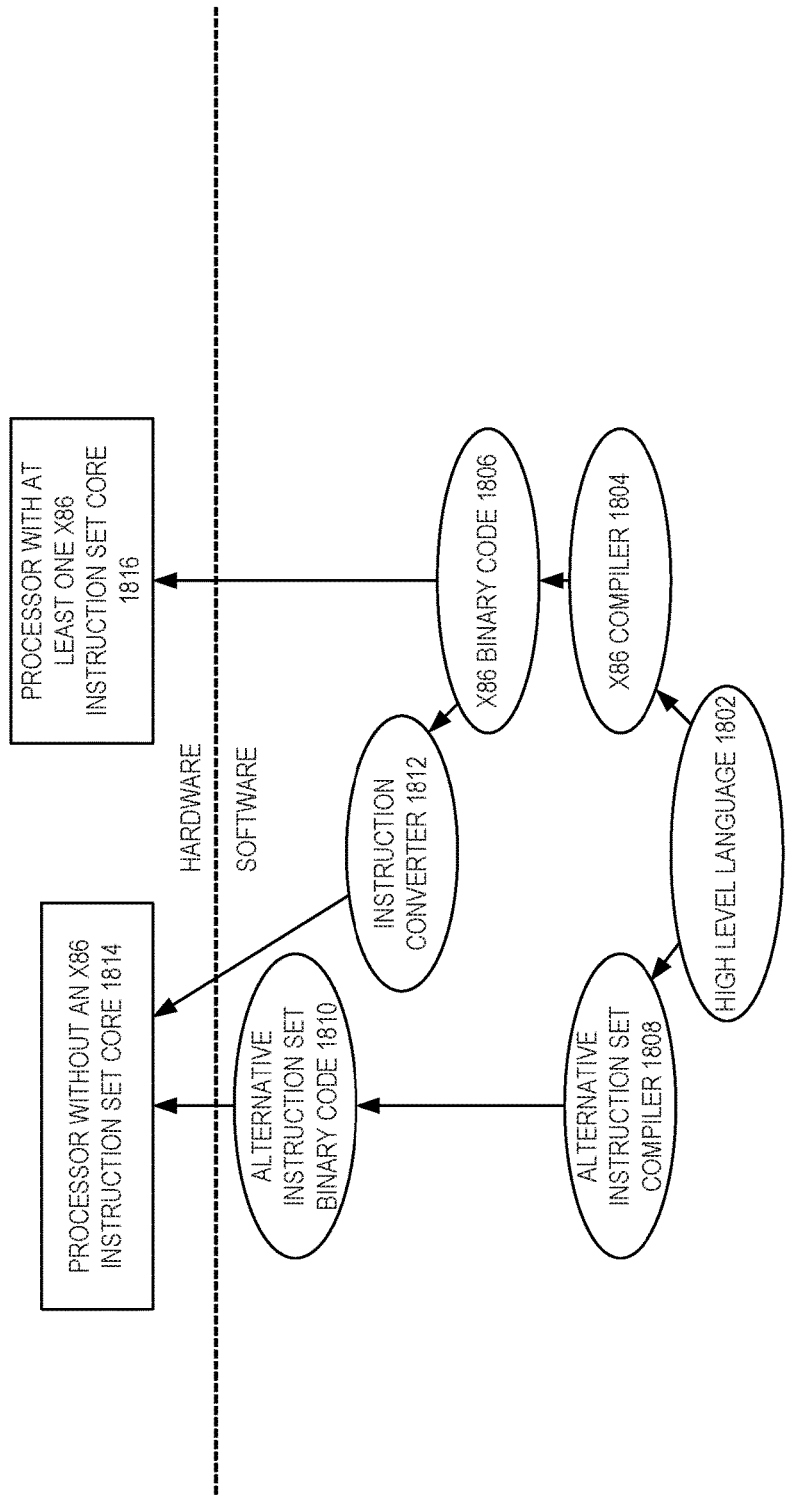
FIG. 18 is a block diagram contrasting the use of a software instruction converter to convert binary instructions in a source instruction set to binary instructions in a target instruction set according to embodiments of the disclosure.

FIG. 18 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 18 shows that a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

What is claimed is:

1. A processor comprising:
   at least one core;
   a performance monitoring unit;
   a memory management unit comprising a first allocator to allocate a first virtual memory region of a memory for a first data structure, and a second allocator to allocate a second, different virtual memory region of the memory for a second data structure, wherein the memory management unit is to enable the performance monitoring unit to monitor a memory access request from the at least one core to the first virtual memory region or the second different virtual memory region when a monitor flag is set; and
   a translation lookaside buffer (TLB) comprising a protection key for a page of a page table,
   wherein the TLB is to translate a virtual address of the memory access request to a physical address and to set the monitor flag when the page includes the virtual address of the memory access request and the protection key indexes into a key register that indicates the virtual address of the memory access request is to be monitored,
   wherein the memory management unit is to append the monitor flag to the physical address.

2. The processor of claim 1, wherein the memory management unit is to append the monitor flag by appending a first value in a monitor flag field to the physical address to set the monitor flag to enable monitoring of the virtual address of the memory access request, and the memory management unit is to append a second, different value in the monitor flag field to the physical address to disable monitoring of the virtual address of the memory access request.

3. The processor of claim 1, wherein the memory management unit is to save the monitor flag on a context switch.

4. The processor of claim 1, wherein the memory management unit is to provide the physical address and appended monitor flag to a cache or memory as the memory access request.

5. The processor of claim 4, wherein a performance monitoring event generated by a memory access is passed to the performance monitoring unit only if a corresponding appended monitor flag is set to true.

6. The processor of claim 1, wherein the key register includes a monitor bit for each possible protection key to specify whether monitoring is enabled for pages corresponding to a protection key.

7. The processor of claim 1, wherein, when the virtual address is not in the translation lookaside buffer, the translation lookaside buffer is to perform a page table walk to fill from memory a copy of the protection key for the virtual address.

8. A method comprising:
   allocating a first virtual memory region of a memory for a first data structure with a first allocator;
   allocating a second, different virtual memory region of the memory for a second data structure with a second allocator;
   detecting a memory access request to the memory;
   translating a virtual address of the memory access request to a physical address with a translation lookaside buffer (TLB) comprising a protection key for a page of a page table;
   setting a monitor flag when the page includes the virtual address of the memory access request and the protection key indexes into a key register that indicates the virtual address of the memory access request is to be monitored; and
   enabling a performance monitoring unit to monitor the memory access request to the first virtual memory region or the second, different virtual memory region when the monitor flag is set.

9. The method of claim 8, wherein the appending of the monitor flag comprises appending a first value in a monitor flag field to the physical address to set the monitor flag to enable monitoring of the virtual address of the memory access request, and the method further comprises appending a second, different value in the monitor flag field to the physical address to disable monitoring of the virtual address of the memory access request.

10. The method of claim 8, further comprising saving the monitor flag on a context switch.

11. The method of claim 8, further comprising providing the physical address and appended monitor flag to a cache or memory as the memory access request.

12. The method of claim 11, wherein a performance monitoring event generated by a memory access is passed to the performance monitoring unit only if a corresponding appended monitor flag is set to true.

13. The method of claim 8, further comprising inputting a monitor bit into the key register for each possible protection key to specify whether monitoring is enabled for pages corresponding to a protection key.

14. The method of claim 8, further comprising, when the virtual address is not in the translation lookaside buffer, performing a page table walk to fill from memory a copy of the protection key for the virtual address.

15. A non-transitory machine readable medium that stores code that when executed by a machine causes the machine to perform a method comprising:
    allocating a first virtual memory region of a memory for a first data structure with a first allocator;

allocating a second, different virtual memory region of the memory for a second data structure with a second allocator;

detecting a memory access request to the memory;

translating a virtual address of the memory access request to a physical address with a translation lookaside buffer (TLB) comprising a protection key for a page of a page table;

setting a monitor flag when the page includes the virtual address of the memory access request and the protection key indexes into a key register that indicates the virtual address of the memory access request is to be monitored;

appending the monitor flag to the physical address; and enabling a performance monitoring unit to monitor the memory access request to the first virtual memory region or the second, different virtual memory region when the monitor flag is set.

16. The non-transitory machine readable medium of claim 15, wherein the appending of the monitor flag comprises appending a first value in a monitor flag field to the physical address to set the monitor flag to enable monitoring of the virtual address, and the method further comprises appending a second, different value in the monitor flag field to the physical address the memory access request to disable monitoring of the virtual address.

17. The non-transitory machine readable medium of claim 15, wherein the method further comprises saving the monitor flag on a context switch.

18. The non-transitory machine readable medium of claim 15, further comprising providing the physical address and appended monitor flag to a cache or memory as the memory access request.

19. The non-transitory machine readable medium of claim 18, wherein a performance monitoring event generated by a memory access is passed to the performance monitoring unit only if a corresponding appended monitor flag is set to true.

20. The non-transitory machine readable medium of claim 15, further comprising inputting a monitor bit into the key register for each possible protection key to specify whether monitoring is enabled for pages corresponding to a protection key.

21. The non-transitory machine readable medium of claim 15, further comprising, when the virtual address is not in the translation lookaside buffer, performing a page table walk to fill from memory a copy of the protection key for the virtual address.

22. A processor comprising:

at least one core;

a performance monitoring unit;

a memory management unit comprising a first allocator to allocate a first virtual memory region of a memory for a first data structure, and a second allocator to allocate a second, different virtual memory region of the memory for a second data structure, wherein the memory management unit is to enable the performance monitoring unit to monitor a memory access request from the at least one core to the first virtual memory region or the second, different virtual memory region when a monitor flag is set, and wherein the memory access request is to generate a performance monitoring event; and a translation lookaside buffer (TLB) comprising a protection key for a page of a page table, wherein the TLB is to translate a virtual address of the memory access request to a physical address and to set the monitor flag when the page includes the virtual address of the memory access request and the protection key indexes into a key register that indicates the virtual address of the memory access request is to be monitored, wherein the memory management unit is to append the monitor flag to the physical address.

23. The processor of claim 22, wherein the memory management unit is to append the monitor flag by appending a first value in a monitor flag field to the physical address to set the monitor flag to enable monitoring of the virtual address, and the memory management unit is to append a second, different value in the monitor flag field to the physical address to disable monitoring of the virtual address of the memory access request.

24. The processor of claim 22, wherein the memory management unit is to save the monitor flag on a context switch.

* * * * *